US012679246B2

(12) United States Patent
Yano et al.

(10) Patent No.: US 12,679,246 B2
(45) Date of Patent: Jul. 14, 2026

(54) POWER SUPPLY DEVICE, AND ELECTRIC VEHICLE AND POWER STORAGE DEVICE EQUIPPED WITH THIS POWER SUPPLY DEVICE

(71) Applicant: SANYO Electric Co., Ltd., Osaka (JP)

(72) Inventors: Junya Yano, Hyogo (JP); Masato Nakayama, Hyogo (JP); Tomonori Kunimitsu, Hyogo (JP); Taisuke Hamada, Hyogo (JP)

(73) Assignee: SANYO Electric Co., Ltd., Osaka (JP)

( * ) Notice: Subject to any disclaimer, the term of this patent is extended or adjusted under 35 U.S.C. 154(b) by 1012 days.

(21) Appl. No.: 17/758,965

(22) PCT Filed: Sep. 15, 2020

(86) PCT No.: PCT/JP2020/034802
§ 371 (c)(1),
(2) Date: Dec. 14, 2022

(87) PCT Pub. No.: WO2021/149299
PCT Pub. Date: Jul. 29, 2021

(65) Prior Publication Data
US 2023/0202345 A1 Jun. 29, 2023

(30) Foreign Application Priority Data
Jan. 23, 2020 (JP) ................................. 2020-009518

(51) Int. Cl.
*B60L 58/22* (2019.01)
*H01M 10/42* (2006.01)
(Continued)

(52) U.S. Cl.
CPC ........... *B60L 58/22* (2019.02); *H01M 10/482* (2013.01); *H01M 50/209* (2021.01);
(Continued)

(58) Field of Classification Search
None
See application file for complete search history.

(56) References Cited

U.S. PATENT DOCUMENTS

| | | | |
|---|---|---|---|
| 2012/0161677 A1 | 6/2012 | Kunimitsu et al. | |
| 2015/0137824 A1 | 5/2015 | Nishihara | |

FOREIGN PATENT DOCUMENTS

| | | |
|---|---|---|
| JP | 2016-213984 A | 12/2016 |
| WO | 2014/024452 | 2/2014 |
| WO | 2015/056468 A1 | 4/2015 |

OTHER PUBLICATIONS

Office Action dated Jan. 9, 2025, issued in Indian Application No. 202247046019, with English translation. (7 pages).
(Continued)

*Primary Examiner* — Jonathan Crepeau
(74) *Attorney, Agent, or Firm* — WHDA, LLP

(57) ABSTRACT
A power supply device includes battery stack in which a plurality of battery cells are stacked, and a plurality of battery modules including cell monitor circuits that detect battery information of battery cells, and cell monitor circuits of the battery modules are cascade-connected via communication lines. Battery module includes a pair of communication terminals that are arranged at both ends and are connected to cell monitor circuit, and inner wires that connect the pair of communication terminals positioned at both the ends. Communication line is connected to communication terminal, and cell monitor circuits of the plurality of battery modules are cascade-connected.

14 Claims, 14 Drawing Sheets

(51) Int. Cl.
   *H01M 10/48*      (2006.01)
   *H01M 50/209*     (2021.01)
   *H01M 50/284*     (2021.01)
   *H01M 50/296*     (2021.01)
   *H01M 50/298*     (2021.01)
   *H02J 7/80*       (2026.01)

(52) U.S. Cl.
   CPC ....... *H01M 50/284* (2021.01); *H01M 50/296*
      (2021.01); *H01M 50/298* (2021.01); *H02J*
      *7/80* (2026.01); *H01M 2010/4271* (2013.01);
      *H01M 2010/4278* (2013.01); *H01M 2220/20*
         (2013.01); *H02J 2207/20* (2020.01)

(56)                References Cited

OTHER PUBLICATIONS

International Search Report of PCT application No. PCT/JP2020/
034802 dated Nov. 10, 2020.
Extended (Supplementary) European Search Report dated Dec. 6,
2023, issued in counterpart EP application No. 20916061.3. (7
pages).

FIG. 10

POWER SUPPLY DEVICE, AND ELECTRIC VEHICLE AND POWER STORAGE DEVICE EQUIPPED WITH THIS POWER SUPPLY DEVICE

TECHNICAL FIELD

The present invention relates to a power supply device including a plurality of battery modules, an electric vehicle and a power storage device including the power supply device, and in particular, to a power supply device for a motor that is mounted on an electric vehicle such as a hybrid car, an electric car, a fuel battery car, or an electric motorcycle and drives the vehicle or a power supply device for a large current used for power storage applications or the like for a house or a factory, and an electric vehicle and a power storage device including the power supply device.

BACKGROUND ART

In a power supply device, a charge and discharge capacity and an output current can be increased by connecting a plurality of battery modules are connected in series or in parallel. This power supply device is used as a power supply for a vehicle such as a hybrid car and an electric car, a power source for a power storage system for a factory, a house, or the like. The battery module used for this power supply device has been developed (see, for example, PTL 1).

As illustrated in an exploded perspective view of FIG. 14, the battery module includes battery stack 902 formed by stacking a plurality of battery cells 901, and cell monitor circuits 906 connected to battery stack 902 to detect battery information such as a voltage of battery cell 901. Battery modules 910 are connected to each other in series and are used for a high-output power supply device. In this power supply device, the cell monitor circuits that detect the battery information of the plurality of battery modules are cascade-connected to transmit the battery information to an external battery control unit (BCU) or the like. In this power supply device, the cell monitor circuits of the plurality of battery modules are cascade-connected, and can be transmitted by one communication line.

CITATION LIST

Patent Literature

PTL 1: WO 2014/024452

SUMMARY OF THE INVENTION

Technical Problem

Although the power supply device in which the cell monitor circuits of the plurality of battery modules are cascade-connected by the communication line can transmit the battery information and the like to the outside by one communication line, in this power supply device, as illustrated in a schematic configuration diagram of FIG. 15, communication lines 844 are wired between battery modules 810 in order to cascade-connect cell monitor circuits 806 of battery modules 810. In power supply device 800, it is necessary to provide wiring space 845 in order to wire communication lines 844 between battery modules 810. Wiring space 845 provided between battery modules 810 has an adverse effect of enlarging entire power supply device 800. Although the power supply device can be compact by narrowing the wiring space, since the communication lines wired in the narrow wiring space is sandwiched between the battery modules on both sides and is damaged, a signal of battery information cannot be stably transmitted to an external battery controller or the like for a long period. In particular, a power supply device mounted on a vehicle or the like receives vibration and impact, and is used in an environment in which external conditions such as temperature and humidity are severe. Thus, it is difficult to reliably prevent the communication line from being damaged for a long period, and it is difficult to transmit important information of the battery to the outside. Thus, reliability as the power supply device is hindered from being maintained for a long period.

The present invention has been developed for the purpose of preventing the above adverse effect, and an object of the present invention is to provide a technique that can make the entire device compact while maintaining high reliability for a long period by simply connecting the battery modules in series.

Solution to Problem

A power supply device according to an aspect of the present invention includes a battery stack stacking a plurality of battery cells, and a plurality of battery modules including cell monitor circuits that detect battery information of the battery cells, the cell monitor circuits being cascade-connected via a communication line. The battery module includes a pair of communication terminals that is arranged at both ends and is connected to the cell monitor circuits, and an inner wire that connects the pair of communication terminals positioned at both the ends. The communication line is connected to each of the pair of communication terminals, and the cell monitor circuits of the plurality of battery modules are cascade-connected.

In the present specification, the term "battery module" is used in a broad sense including all battery modules including cell monitor circuits of voltages that detect voltages of battery cells by arranging end plates on both end surfaces of the plurality of battery cells and coupling the pair of end plates by the bind bar, for example, a "battery pack" that does not incorporate a controlling circuit such as a charge and discharge controlling circuit that controls a charge and discharge current.

An electric vehicle according to another aspect of the present invention includes the power supply device, a motor for traveling that receives electric power from the power supply device, a vehicle body on which the power supply device and the motor are mounted, and wheels that are driven by the motor and cause the vehicle body to travel.

A power storage device according to an aspect of the present invention includes the above power supply device, and a power supply controller that controls charging and discharging of the power supply device. The power supply controller enables charging of the plurality of battery cells with electric power from outside, and controls charging to be performed on the plurality of battery cells.

Advantageous Effect of Invention

The power supply device described above has an advantage that the entire power supply device can be made compact while maintaining high reliability for a long period while cascade-connecting the cell monitor circuits of the plurality of battery modules by the communication lines.

BRIEF DESCRIPTION OF THE DRAWINGS

FIG. 5 is a cross-sectional view taken along line V-V of the battery module illustrated in

FIG. 3.

FIG. 10 is a schematic circuit diagram of a power supply device illustrated in FIG. 1.

DESCRIPTION OF EMBODIMENT

Figure 1:
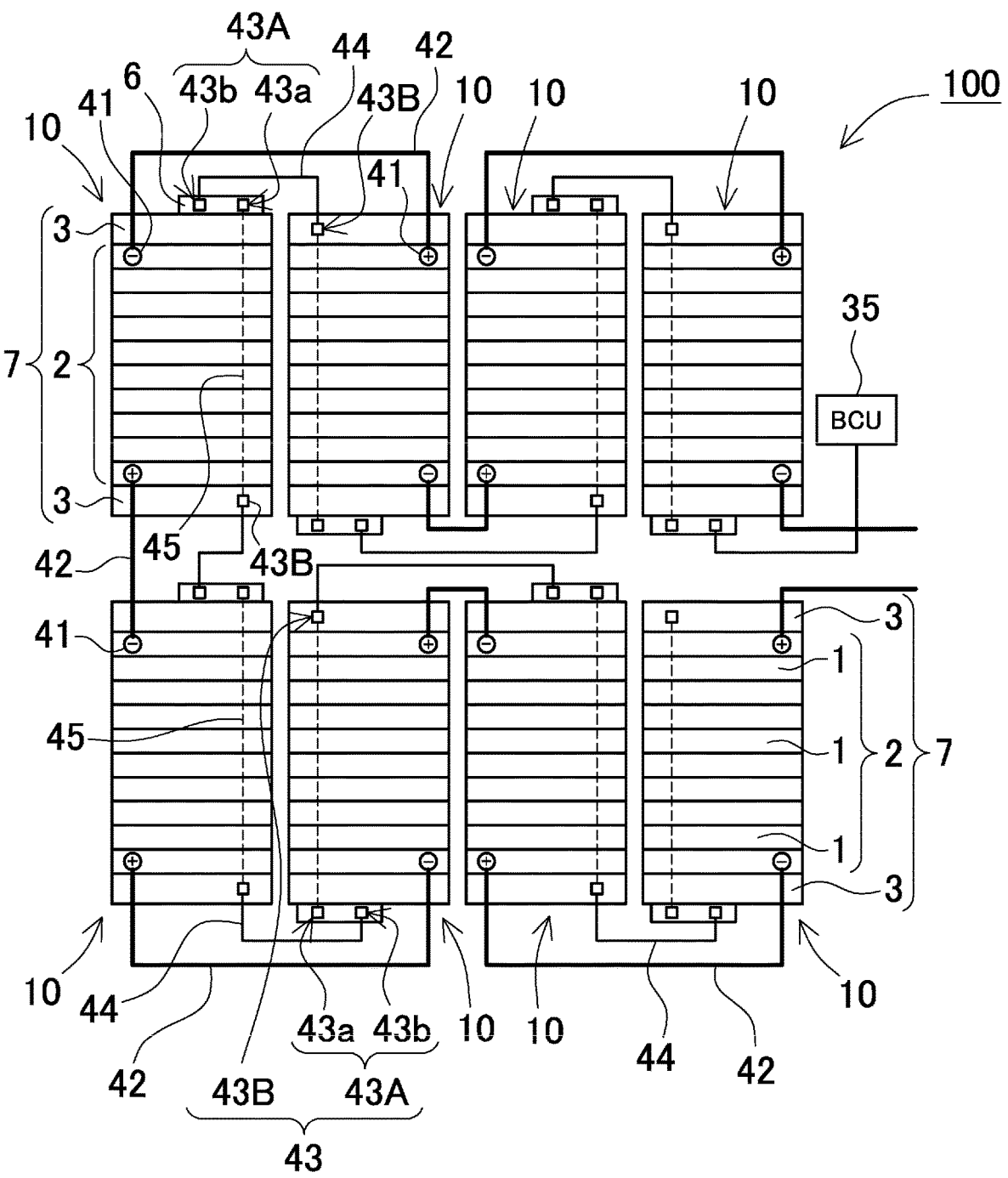
FIG. 1 is a schematic configuration diagram of a power supply device according to an exemplary embodiment of the present invention.

Hereinafter, the present invention will be described in detail with reference to the drawings. Note that, in the following description, terms (for example, "top", "bottom", and other terms including those terms) indicating specific directions or positions are used as necessary; however, the use of those terms is for facilitating the understanding of the invention with reference to the drawings, and the technical scope of the present invention is not limited by the meanings of the terms. Parts denoted by the same reference marks in a plurality of drawings indicate the same or equivalent parts or members.

Exemplary embodiments to be described below illustrates a specific example of the technical idea of the present invention, and the present invention is not limited to the exemplary embodiment below. In addition, unless otherwise specified, dimensions, materials, shapes, relative arrangements, and the like of the configuration components described below are not intended to limit the scope of the present invention only to them, but are intended to be illustrative. The contents described in one exemplary embodiment or example are also applicable to other exemplary embodiments and examples. Further, sizes, positional relationships, and the like of the members illustrated in the drawings may be exaggerated for clarifying the contents of description.

A power supply device according to a first aspect of the present invention includes a battery stack stacking a plurality of battery cells, and a plurality of battery modules including cell monitor circuits that detect battery information, and the cell monitor circuits are cascade-connected via a communication line. In the battery module, a pair of communication terminals connected to the cell monitor circuit are arranged at both ends. A pair of communication terminals arranged at both ends of the battery module is connected by an inner wire. The communication line is connected to the communication terminal of the battery module, and the cell monitor circuits of the plurality of battery modules are cascade-connected.

In the power supply device described above, while the cell monitor circuits of the plurality of battery modules are cascade-connected by the communication lines, it is not necessary to wire the communication lines between the battery modules in order to cascade-connect the cell monitor circuits of the adjacent battery modules. This is because the battery module connects the communication terminals at both ends inside via the inner wire. Thus, the power supply device described above can be made compact as a whole by omitting the wiring space of the communication lines between the battery modules. Since the inner wires are wired in the battery module, the inner wires are protected by the cover case of the battery module to prevent damage to the inner wires, and battery information of the battery module is reliably transmitted to an external battery controller or the like over a long period. Thus, the reliability as the power supply device can be maintained high. In particular, in a severe use environment, it is possible to ensure high reliability by preventing the inner wire from being damaged.

In a power supply device according to a second aspect of the present invention, the plurality of battery modules are connected in series via power lines, and the battery modules connected in series via the power lines are cascade-connected via the communication line.

In the power supply device described above, since the battery modules connected in series by the power lines are cascade-connected by the communication lines, the power line and the communication line can be connected at the shortest distance by connecting the power line and the communication line to the same battery module.

A power supply device according to a third aspect of the present invention further includes a pair of the battery modules arranged in a straight line. Output terminals at ends opposing each other are connected by the power line, and communication terminals at ends opposing each other are connected via the communication line.

The power supply device described above has an advantage that the power line and the communication line can be efficiently connected at the shortest distance because the opposing ends of the pair of battery modules arranged in a straight line are connected to the power line by the communication line.

A power supply device according to a fourth aspect of the present invention further includes a pair of the battery modules arranged adjacent to each other in a parallel. Output terminals at ends approaching each other are connected by the power line, and the communication terminals at ends approaching each other are connected via the communication line.

The power supply device described above has an advantage that the power line and the communication line can be efficiently connected by connecting both the power line and the communication line to the ends of the pair of battery modules arranged in the parallel posture.

In a power supply device according to a fifth aspect of the present invention, the battery module includes a battery assembly arranging the battery stack between a pair of end plates, and a cover case that covers the inner wire, and the cell monitor circuit is arranged on the end plate.

In the power supply device described above, since the cell monitor circuits are cascade-connected by the communication lines while the cell monitor circuit are arranged on the end plates, the power supply device can be made compact to increase the charge and discharge capacity with respect to a unit volume while protecting the cell monitor circuits from a high-temperature and high-pressure exhaust gas exhausted from the battery cell, and the heat energy of the cell monitor circuit can be efficiently dissipated to the end plate and the outside to reduce the temperature rise of the cell monitor circuit. In particular, in the above structure, since the cell monitor circuits are arranged on the end plates arranged in a vertical posture, there is an advantage that the cell monitor circuits are arranged in the vertical posture, the air is smoothly circulated on the surface, and heat can be efficiently dissipated. Since the end plates interrupt the cell monitor circuit from the high-temperature and high-pressure exhaust gas, even in an abnormal use state of the battery cell in which an exhaust valve is opened, the cell monitor circuit can be in a normal operation state to ensure high safety. The characteristic that the heat energy of the cell monitor circuit can be efficiently dissipated also implements an advantage that the temperature rise can be reduced while the cell monitor circuit is downsized. The temperature rise of the electronic component mounted on the cell monitor circuit is also reduced, and an advantage that a stable operation of the electronic component can be guaranteed is also implemented.

In the power supply device according to the sixth aspect of the present invention, the communication terminal is arranged on the end plate.

In a power supply device according to a seventh aspect of the present invention, the cell monitor circuit is arranged on one end plate of the battery module, and the pair of communication terminals is arranged on the cell monitor circuit arranged on one end plate and the end plate on which the cell monitor circuit is not arranged.

In a power supply device according to an eighth aspect of the present invention, the communication terminal provided on the end plate is a relay connector, and the relay connector connects the inner wire and the communication line.

In a power supply device according to a ninth aspect of the present invention, the inner wire is wired inside the cover case.

In the power supply device described above, since the inner wires are arranged inside the cover case, the inner wires are protected by the cover case, and higher safety can be ensured.

In a power supply device according to a tenth aspect of the present invention, the pair of communication terminals is a connector that detachably connects the communication lines.

A power supply device according to an eleventh aspect of the present invention includes voltage detection lines that connect the plurality of battery cells constituting the battery stack and the cell monitor circuits. The inner wire is a group of lines including a plurality of communication wires parallel to the voltage detection lines.

In the power supply device described above, since the inner wire has an integrated structure with the voltage detection line, there is no need to wire a dedicated inner wire, and the wiring of the inner wire can be extremely simplified and assembled efficiently. Since both the voltage detection line and the inner wire are wired in a posture extending in a longitudinal direction of the battery assembly, there is an advantage that both the voltage detection line and the inner wire can be wired particularly efficiently as the group of lines of a plurality of communication wires.

In a power supply device according to a twelfth aspect of the present invention, the group of lines is wire harness that connect connectors to both ends.

In the battery module described above, since the inner wire can be provided by increasing one lead wire in a step of assembling the wire harness for the voltage detection line, the inner wire can be provided extremely easily and efficiently, and the assembling step can be simplified by omitting the wiring step of the inner wire.

In a power supply device according to a thirteenth aspect of the present invention, the group of lines is printed board wiring the voltage detection lines and the inner wires.

In the power supply device described above, since the inner wire can be provided by providing one wiring line in parallel with the voltage detection line in a step of manufacturing the printed board, component cost for providing the inner wire can be significantly reduced. Since the inner wire can also be wired by arranging the printed board, there is an advantage that both the component cost and the assembly cost can be significantly reduced.

In a power supply device according to a fourteenth aspect of the present invention, the printed board is a flexible printed board.

In the power supply device described above, since one wiring can be provided in parallel with the voltage detection line to provide the inner wire in a step of manufacturing the flexible printed board, both the component cost and the assembly cost can be remarkably reduced, and the flexible printed board can be further freely deformed. Thus, there is an advantage that wiring can be performed in a narrow region more efficiently.

First Exemplary Embodiment

In power supply device 100 illustrated in a schematic configuration diagram of FIG. 1, cell monitor circuits 6 of a plurality of battery modules 10 are cascade-connected by communication lines 44. In power supply device 100, output terminals 41 of adjacent battery modules 10 are connected in series by power line 42. Power lines 42 connect battery assemblies 7 of battery modules 10 in series, and communication lines 44 cascade-connect cell monitor circuits 6 of battery modules 10.

Figure 2:
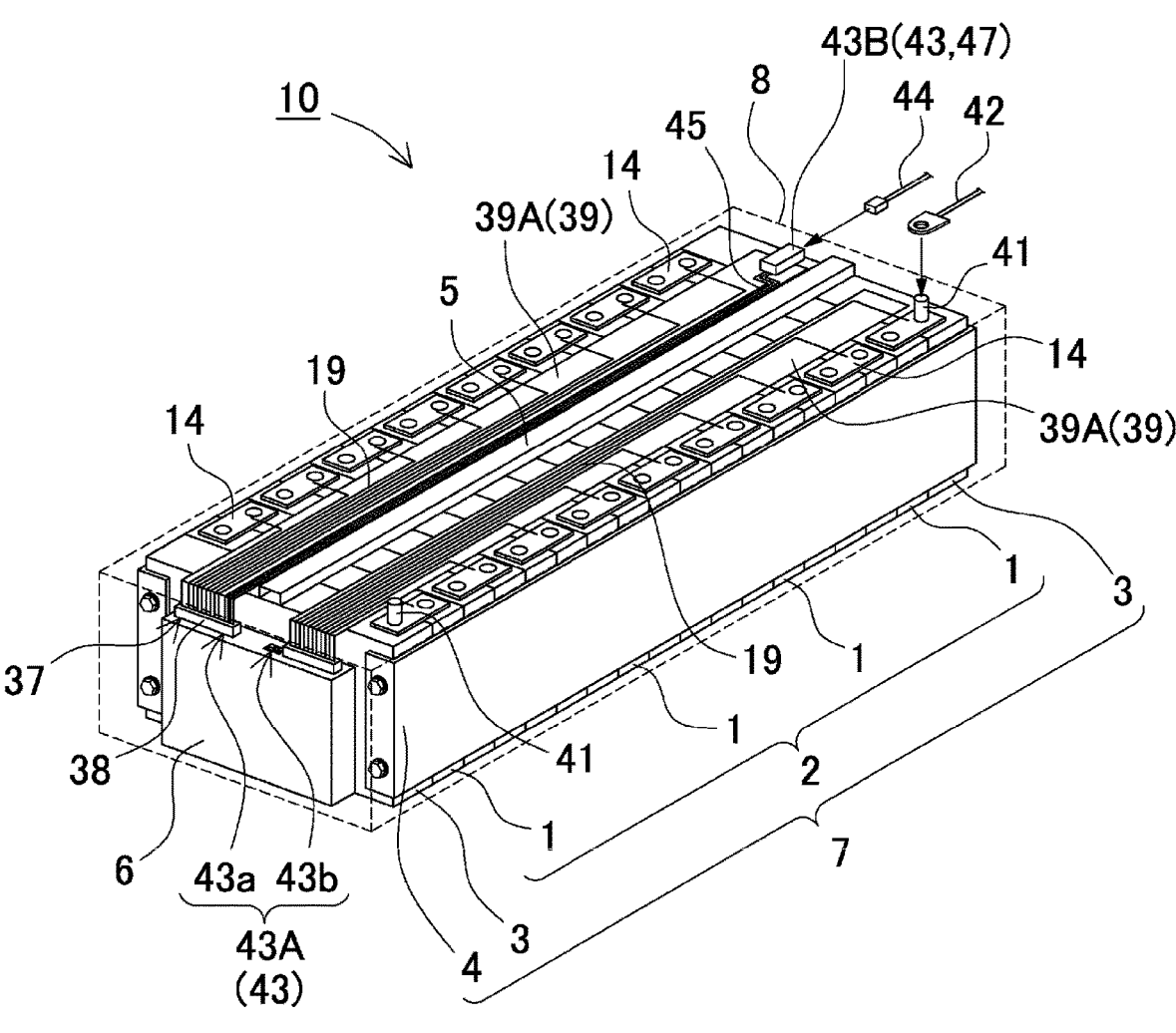
FIG. 2 is a schematic perspective view illustrating a battery module.

In battery module 10 illustrated in a schematic perspective view of FIG. 2, a pair of communication terminals 43 are arranged at both ends of battery assembly 7. In battery module 10 in this drawing, end plates 3 at both ends of battery assembly 7 and communication terminals 43 are provided in cell monitor circuits 6 fixed to end plates 3. Communication terminal 43 is a connector, and connects communication lines 44 via the connector. Communication terminal 43 can easily connect communication lines 44 via the connector.

In battery module 10 illustrated in FIG. 2, one communication terminal 43B is provided in end plate 3, and other communication terminal 43A is provided in cell monitor circuit 6 arranged in end plate 3, and the pair of communication terminals 43A, 43B are arranged at both ends of battery assembly 7. In battery module 10, the pair of communication terminals 43A and 43B arranged at both ends of battery assembly 7 are connected by inner wire 45. In battery module 10 of FIG. 2, one end of inner wire 45 is connected to communication terminal 43B of the connector provided in end plate 3, and the other end is connected to communication terminal 43A of the connector provided in cell monitor circuit 6. Cell monitor circuit 6 includes internal communication terminal 43*a* that connects inner wire 45 and external communication terminal 43*b* that connects communication line 44. In cell monitor circuit 6, internal communication terminal 43*a* and external communication terminal 43*b* are internally connected by a transmission circuit that transmits battery information. Communication terminal 43B arranged on end plate 3 is relay connector 47 that connects both inner wire 45 and communication line 44. Relay connector 47 is a connector that can connect both inner wire 45 and communication line 44.

(Communication Line 44)

In power supply device 100 of FIG. 1, cell monitor circuits 6 of the plurality of battery modules 10 connected in series by power line 42 are cascade-connected by communication line 44. Power line 42 is connected to output terminal 41 of battery module 10, and the plurality of battery modules 10 can be connected in series or in parallel. In power supply device 100 in this drawing, cell monitor circuits 6 of a plurality of battery modules 10 connected in series by power lines 42 are cascade-connected by communication lines 44 arranged in parallel with power lines 42. As illustrated in the drawing, power supply device 100 that connects all battery modules 10 increases by power line 42 to increase an output voltage can be effectively used as a power source of an electric vehicle such as a hybrid car or an electric car and also as a power storage device having a high output. In power supply device 100 in this drawing, although cell monitor circuits 6 of battery modules 10 connected in series by power line 42 are cascade-connected by communication line 44, the power supply device can also cascade-connect cell monitor circuits 6 of the plurality of battery modules 10 connected in parallel or in series by communication lines 44 without connecting all battery modules 10 in series by power lines 42. Although not illustrated, in the power supply device, the cell monitor circuits of the battery modules can be cascade-connected by the communication lines by connecting the plurality of battery modules in parallel and in series by the power lines, or the cell monitor circuits of the battery modules may be cascade-connected by the communication lines by connecting all the battery modules in parallel by the power lines.

Communication line 44 is connected to communication terminals 43 provided at both ends of battery module 10 to cascade-connect cell monitor circuits 6 of battery module 10. In power supply device 100, both inner wire 45 and communication line 44 are connected to cell monitor circuit 6, and the plurality of cell monitor circuits 6 are connected in series.

In power supply device 100 of FIG. 1, battery modules 10 connected in series by power lines 42 are cascade-connected via communication lines 44. In power supply device 100, power line 42 and communication line 44 are arranged in parallel, and adjacent battery modules 10 are connected in series. In power supply device 100 of FIG. 1, all battery modules 10 are in a parallel posture, and eight sets of battery modules 10 are arranged in four rows and two stages. In the drawing, upper four battery modules 10 are connected in series by both power lines 42 and communication lines 44, lower four battery modules 10 are also connected in series by power lines 42 and communication lines 44. In upper and lower battery modules 10, upper and lower battery modules 10 are connected in series by power lines 42 and communication lines 44 in a leftmost row in the drawing, and all battery modules 10 are connected in series by both power lines 42 and communication lines 44.

Two sets of battery modules 10 arranged in the leftmost row in FIG. 1 are arranged in a straight line, output terminals 41 at opposing ends are connected by power lines 42, and the connector of communication terminal 43A of cell monitor circuit 6 provided at opposing ends and relay connector 47 which is communication terminal 43B are connected by communication lines 44. In battery modules 10 arranged adjacent to each other vertically, upper and lower battery modules 10 are cascade-connected by connecting output terminals 41 provided at ends on the same side, that is, approaching ends by power line 42 and connecting communication terminals 43A, 43B by communication line 44.

(Battery Module 10)

Figure 3:
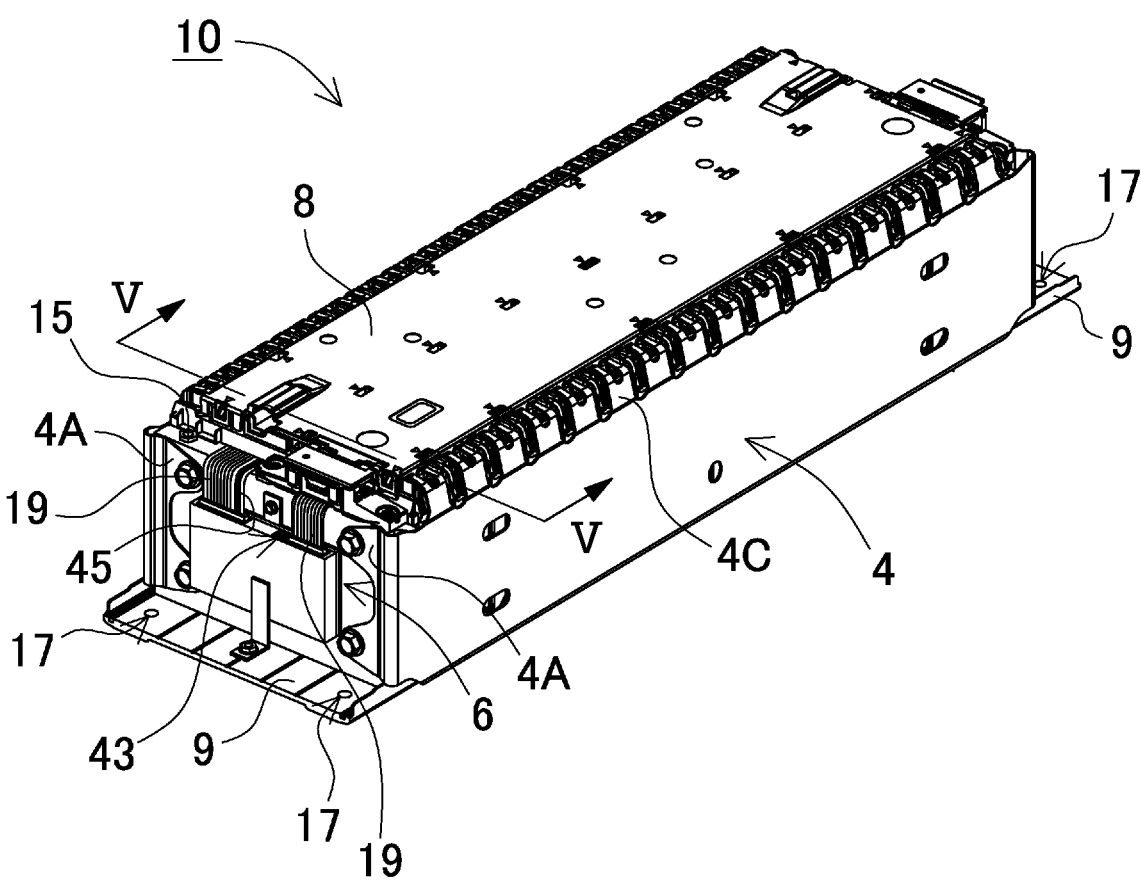
FIG. 3 is a perspective view of the battery module.
Figure 4:
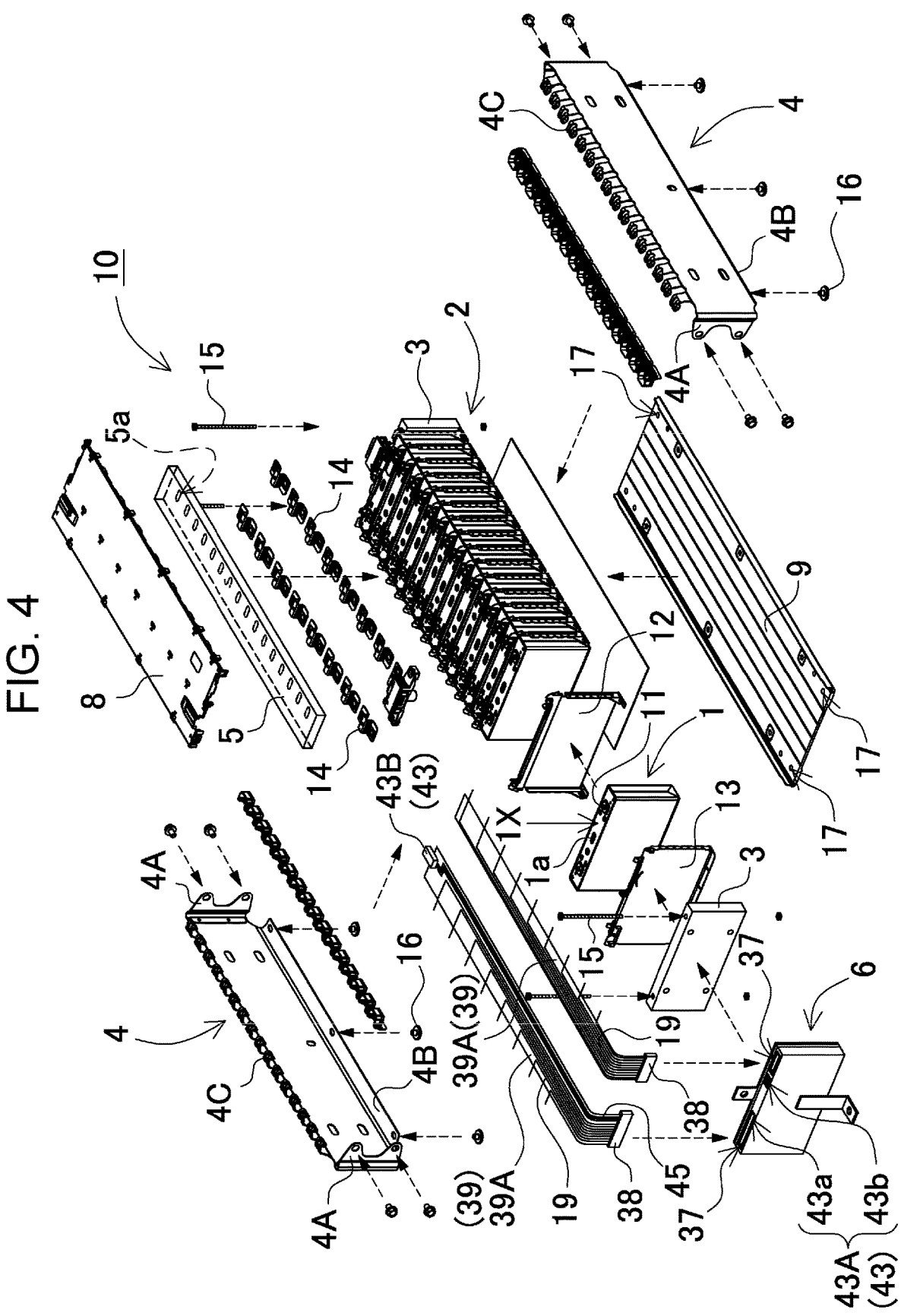
FIG. 4 is an exploded perspective view of the battery module illustrated in FIG. 3.
Figure 5:
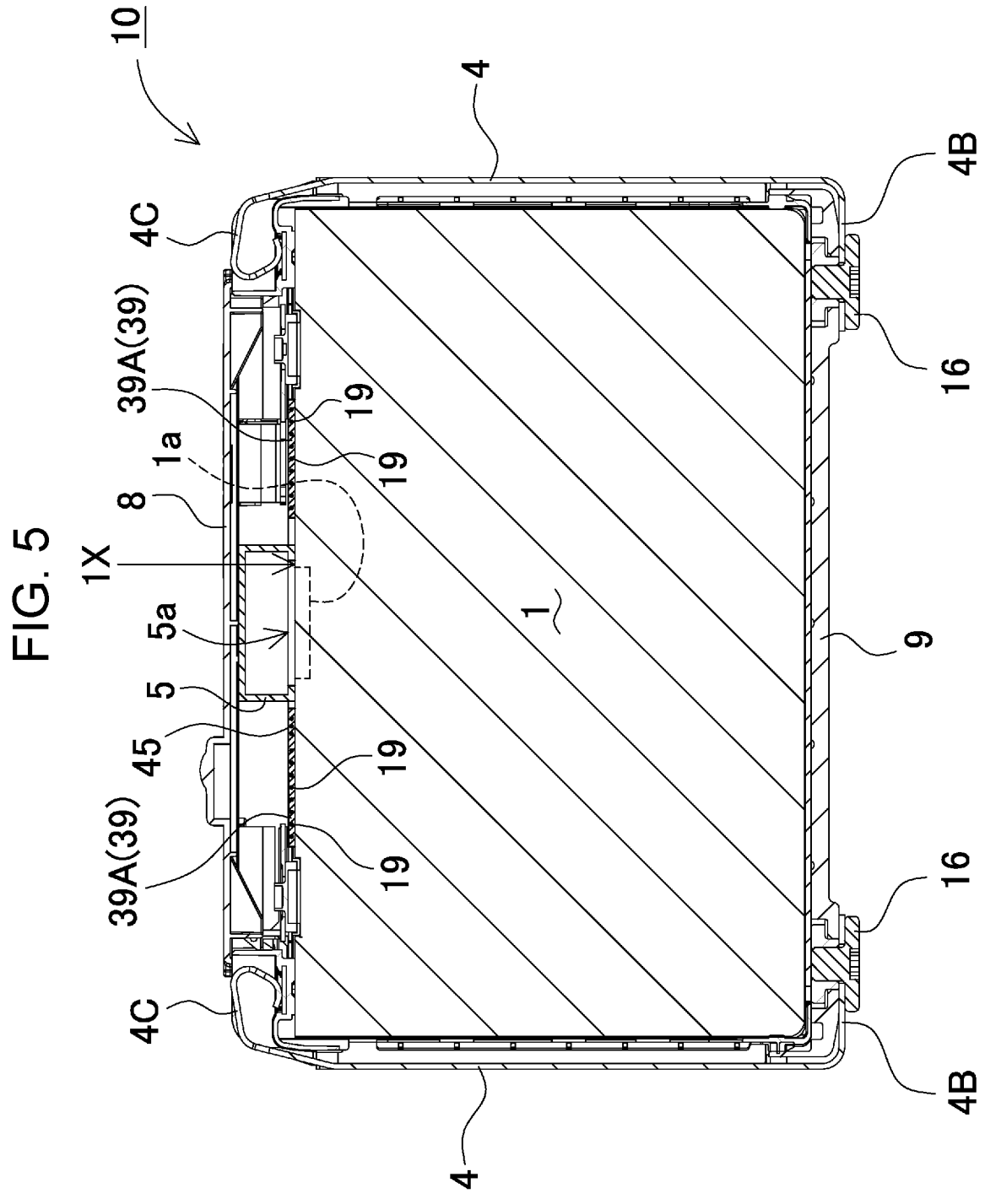

Battery module 10 illustrated in FIGS. 3 to 5 includes battery assembly 7 in which battery stack 2 is arranged between the pair of end plates 3, and cover case 8 covering inner wires 45, and cell monitor circuit 6 is arranged on end plates 3. In battery module 10 illustrated in a schematic perspective view of FIGS. 2 to 4, cell monitor circuit 6 is arranged on an outer surface of one end plate 3 of battery assembly 7. In battery assembly 7, a pair of end plates 3 arranged at both ends of battery stack 2 in which a plurality of battery cells 1 are stacked are coupled by bind bar 4. The pair of end plates 3 coupled to bind bar 4 fix battery stack 2 in a pressurized state. Cell monitor circuit 6 includes a voltage detection circuit that detects voltages of battery cells 1, and an interface circuit that outputs battery information such as a cell voltage of each battery detected by the voltage detection circuit to an external battery controller (BCU).

The voltage detection circuit of cell monitor circuit 6 detects the voltage of each battery cell in order to prevent overcharge and overdischarge of battery cell 1, adjust cell balance of the battery cell, or calculate the remaining capacity of the battery cell. The voltage detection circuit of cell monitor circuit 6 is connected to electrode terminal 11 of battery cell 1 via voltage detection line 19, and detects the voltage of battery cell 1. In battery module 10 of FIG. 2, cell monitor circuit 6 is arranged on an outer surface of end plate 3. Battery module 10 can prevent cell monitor circuit 6 from high-temperature and high-pressure exhaust gas jetted from battery cells 1 at the time of abnormality.

In battery module 10, communication terminals 43 connected to cell monitor circuits 6 are arranged at both ends of battery assembly 7. In battery module 10 of FIG. 2, one communication terminal 43A is provided at one end (a left end in the drawing) of battery assembly 7, and other communication terminal 43B is arranged at the other end (a right end in the drawing) of battery assembly 7. In battery module 10 of FIG. 2, one communication terminal 43A at a left end in the drawing is arranged on one end plate 3 via cell monitor circuit 6, and other communication terminal 43B at a right end is arranged on other end plate 3. In battery module 10 of FIG. 2, one communication terminal 43A is arranged on one end plate 3 via cell monitor circuit 6, but communication terminal 43A may be directly arranged on end plate 3. Communication terminal 43 arranged on end plate 3 fixing cell monitor circuit 6 is connected to cell monitor circuit 6 via a lead wire (not illustrated).

In power supply device 100 of FIG. 1, cell monitor circuits 6 provided in battery modules 10 are cascade-connected via communication lines 44, and battery information and the like are transmitted to battery controller (BCU) 35 and the like provided outside through one line. In order to externally connect communication line 44 to battery module 10 to cascade-connect the plurality of cell monitor circuits 6, each battery module 10 internally connects the pair of communication terminals 43A, 43B by inner wire 45.

In battery module 10 illustrated in FIGS. 3 to 5, an upper surface of battery assembly 7 is covered with cover case 8, and inner wires 45 are wired inside cover case 8. Cover case 8 illustrated in the drawing covers substantially the entire upper surface of battery assembly 7 to cover terminal surface 1X of battery cell 1, and is made of an insulating resin. Cover case 8 illustrated in the drawing has a plate shape as a whole, covers the upper surface of battery assembly 7 as a simple shape, and covers inner wires 45 wired to the upper surface of battery assembly 7. Inner wires 45 are arranged inside cover case 8 in this manner, and thus, inner wire 45 is protected by cover case 8 to ensure high safety. However, as indicated by a chain line in FIG. 2, cover case 8 can cover the upper surface of battery assembly 7 as a shape for housing battery assembly 7. Cell monitor circuits 6 are cascade-connected via communication lines 44 externally connected to battery module 10 and inner wires 45 internally connected to battery module 10.

(Battery Assembly 7)

Battery assembly 7 includes battery stack 2 in which the plurality of battery cells 1 are stacked in a thickness, the pair of end plates 3 arranged at both ends of battery stack 2 in a stacking direction of battery cells 1, and bind bar 4 coupled to end plates 3 at both ends of battery stack 2. In battery module 10 illustrated in FIGS. 3 and 4, cell monitor circuit 6 is arranged on one end plate 3, and cell monitor circuit 6 is connected to battery cells 1 of battery stack 2 via voltage detection lines 19. Battery module 10 illustrated in the drawing includes gas duct 5 coupled to exhaust valve 1a of each battery cell 1 to exhaust the exhaust gas ejected from exhaust valve 1a to the outside, cover case 8 arranged above battery stack 2 and on gas duct 5, and base plate 9 arranged below the battery stack to fix end plates 3.

(Battery Cell 1)

As illustrated in FIG. 4, battery cell 1 is a rectangular secondary battery having a width larger than a thickness, in other words, thinner than the width, and the battery cells are stacked in the thickness to form battery stack 2. Battery cell 1 is a lithium ion secondary battery. However, the battery cell may be any other chargeable secondary battery, such as a nickel hydride battery and a nickel cadmium battery. In battery cell 1, plus and minus electrode plates are housed in an exterior can having a sealed structure together with an electrolyte solution. The exterior can is formed by press-molding a metal sheet made of aluminum, an aluminum alloy, or the like into a rectangular shape, and an opening part is hermetically sealed with a sealing plate. The sealing plate is made of the aluminum or aluminum alloy same as the exterior can, and fixes plus and minus electrode terminals 11, and an exhaust valve is provided between electrode terminals 11. Plus and minus electrode terminals 11 are in a state where at least one of electrode terminals 11 is insulated from the sealing plate. Battery cell 1 is provided with plus and minus electrode terminals 11 with the sealing plate as terminal surface 1X. In battery cell 1, a bottom surface and a side surface of the exterior can are covered with an insulating film.

The plurality of battery cells 1 are stacked to allow the thickness of each battery cell 1 to be aligned with the stacking direction to constitute battery stack 2. Battery cell 1 has one outer peripheral surface of a quadrangle as terminal surface 1X provided with plus and minus electrode terminals 11. The plurality of battery cells 1 are stacked to form battery stack 2 in which terminal surfaces 1X are arranged on the same plane.

(Battery Stack 2)

As illustrated in FIG. 4, in battery stack 2, insulating spacer 12 is sandwiched between stacked battery cells 1. Insulating spacer 12 in the drawing is made of an insulating material such as resin formed into a thin plate shape or a sheet shape. Insulating spacer 12 illustrated in the drawing has a plate shape having substantially the same size as an opposing surface of battery cell 1. Insulating spacer 12 is stacked between adjacent battery cells 1 and insulates adjacent battery cells 1 from each other. As the spacer arranged between adjacent battery cells 1, a spacer having a shape in which a flow path of a cooling gas is formed between the battery cell and the spacer may also be used.

In battery stack 2, bus bars 14 made of metal are connected to plus and minus electrode terminals 11 of adjacent battery cells 1. The plurality of battery cells 1 are connected in series or in parallel or in series and in parallel by bus bars 14. In battery stack 2, the output voltage and the chargeable and dischargeable capacity are set as set values by the number of battery cells 1 to be stacked. Battery stack 2 is capable of increasing the output voltage by the number of battery cells 1 connected in series and increasing the charge and discharge capacity by the number of battery cells 1. In battery module 10, the output voltage and the capacity are set as set values by the number of battery cells 1 constituting battery stack 2 and the connection state of connecting in series and in parallel. Therefore, the number of battery cells 1 and the connection state are in an optimal state in consideration of the application.

Bus bar 14 is provided with a connection part (not illustrated) for connection to electrode terminal 11. Bus bar 14 is welded and connected to electrode terminal 11 by irradiating a boundary connecting the connection part and electrode terminal 11 with a laser beam. The bus bar may be coupled to the electrode terminal by providing a male screw in the electrode terminal, opening a through-hole for inserting the electrode terminal, and screwing a nut into the male screw of the electrode terminal inserted in the through-hole, or may be coupled to the electrode terminal by providing a female screw hole in the electrode terminal, and screwing a set screw penetrating the bus bar into the female screw hole. In battery module 10, an upper surface of battery stack 2 can be provided with a resin insulating cover (not illustrated). The insulating cover is provided with an opening part, electrode terminal 11 is exposed from this opening part, bus bar 14 of a metal sheet is connected to electrode terminal 11 exposed from the opening part of the insulating cover near the upper surface of the insulating cover, and the plurality of battery cells 1 can be connected in a predetermined array.

(End Surface Spacer 13)

In battery stack 2, end plates 3 can be arranged on both end surfaces with end surface spacers 13 interposed therebetween in order to insulate the battery stack from end plates 3 made of metal. End surface spacers 13 are arranged between battery stack 2 and end plates 3 to insulate end plates 3 from battery stack 2. Each end surface spacer 13 is made of an insulating material such as resin and formed into a thin plate shape or a sheet shape. End surface spacer 13 is provided with a plate part having a size capable of covering the entire opposing surface of battery cell 1, and this plate part is stacked between battery cell 1 and end plates 3 arranged at both ends of battery stack 2.

(End Plate 3)

End plates 3 are provided on both end surfaces of battery stack 2 in the stacking direction of battery cells 1, and fix battery stack 2. End plate 3 is a metal sheet and is a quadrangular plate whose outer shape is substantially equal to the outer shape of battery cell 1 or slightly larger than battery cell 1. End plate 3 can be made of a high-tensile strength steel to have a tough structure. End plate 3 may be a single metal sheet, may have a structure in which a plurality of metal sheets are stacked, or may be a stack of a metal sheet and plastic. End plate 3 made of one metal sheet has a large heat capacity, and can efficiently absorb heat energy of cell monitor circuit 6. In end plate 3 on which a plurality of sheets are stacked, a surface side to which cell monitor circuit 6 is fixed is at least a metal sheet. This is because cell monitor circuit 6 is fixed in a thermally coupled state and improves heat dissipation characteristics. The end plate can be a stacked structure of an aluminum plate and a high-tensile steel plate. This end plate may also have a structure in which cell monitor circuit 6 is fixed with the surface side as an aluminum plate, the aluminum plate and the high-tensile steel plate are stacked in a surface contact state and heat may be efficiently conducted from the aluminum plate to the high-tensile steel plate. However, the end plate is not necessarily made of metal, and may be made of plastic having excellent strength, such as engineering plastic.

(Bind Bar 4)

Bind bar 4 extends in the stacking direction of battery cells 1, fixes both ends to end plate 3, and fixes battery stack 2 with the pair of end plates 3. Bind bar 4 illustrated in FIGS. 3 and 4 is a metal sheet having a predetermined vertical width along a side surface of battery stack 2 and a predetermined thickness. The bind bars are arranged so as to oppose both side surfaces of battery stack 2. Bind bars 4 pressurize both end surfaces of battery stack 2 with a strong pressure, and dispose battery cells 1 about to swell by charging and discharging at a fixed position. As the metal sheet of bind bar 4, a high-tensile strength steel is preferably used. Bind bar 4 made of a metal sheet is formed into a predetermined shape by press-molding.

As illustrated in an exploded perspective view in FIG. 4, in order to fix both ends of bind bar 4 to the pair of end plates 3, fixing parts 4A bent along the outer surface of end plate 3 are provided at both ends in a stacking direction of battery stack 2. Bind bar 4 fastens the pair of end plates 3 by, for example, screwing fixing parts 4A to end plates 3.

As illustrated in FIGS. 4 and 5, a lower end of bind bar 4 is bent into an L shape to form lower coupling piece 4B. Lower coupling piece 4B is stacked on lower surface sides of both side parts of base plate 9 and coupled to base plate 9. Bind bar 4 is bent at an upper end to form pressing pieces 4C that press an end of the upper surface of battery stack 2. Pressing pieces 4C are separated for each battery cell 1 so as to individually press upper surfaces of battery cells 1 of battery stack 2. This allows each pressing piece 4C to press battery cell 1 toward base plate 9 independently of adjacent pressing pieces 4C. In this way, each battery cell 1 is blocked from floating from base plate 9 and held in a height direction, and even though vibration, impact, and the like are applied to battery stack 2, each battery cell 1 can be maintained so as not to be displaced in an up-down direction. In this manner, bind bars 4 cover and hold corners of upper and lower surfaces of battery stack 2 on both left and right sides of battery stack 2.

As for the shape of bind bar 4 and the structure for fastening with end plates 3, known structures can be appropriately used. For example, both ends of the bind bar may be formed into a flat plate shape without being bent into an L shape and may be screwed with a side surface of the end plate. Alternatively, a part where the bind bar opposes the side surface of the end plate may have an engagement structure to be engaged in a stepped manner, and the bind bar may be further screwed in a state of being locked to the side surface of the end plate with a locking structure.

An insulating sheet may be interposed between bind bar 4 and battery stack 2. The insulating sheet is made of a material having an insulating property such as resin and provides insulation between bind bar 4 made of metal and battery cells 1.

(Base Plate 9)

As illustrated in FIGS. 4 and 5, base plate 9 is arranged on bottom surfaces of battery stack 2 and end plate 3. End plate 3 is fixed to base plate 9, and more preferably, the lower end of bind bar 4 is also fixed to the base plate. End plate 3 and bind bar 4 are fixed to base plate 9 via fixing screws 15, 16. Fixing screw 15 for fixing end plate 3 penetrates end plate 3 in the up-down direction and fixes end plate 3 to base plate 9. Fixing screw 16 for fixing bind bar 4 also penetrates lower coupling piece 4B, which is a lower end of bind bar 4, and is fixed to base plate 9.

In battery stack 2, each battery cell 1 is arranged in a thermally coupled state with base plate 9 in contact with base plate 9. Battery cell 1 thermally coupled to base plate 9 dissipates heat energy to base plate 9. Base plate 9 may be forcibly cooled to further efficiently dissipate heat energy of battery cell 1. Although not illustrated, base plate 9 to be forcibly cooled can be forcibly cooled by circulating a refrigerant or a coolant inside of the base plate. The base plate may also be forcibly cooled by providing a heat dissipation fin on the lower surface. The base plate may also be forcibly cooled by cooling plates stacked in a surface contact state on the lower surface of the base plate. The cooling plate can be forcibly cooled by circulating a refrigerant or a coolant inside of the cooling plate.

(Gas Duct 5)

As illustrated in FIGS. 2 to 5, gas duct 5 is arranged on an upper surface of battery cell 1, that is, at a position opposing terminal surface 1X of battery cell 1, and exhausts exhaust gas ejected from exhaust valve 1a. Gas duct 5 illustrated in the drawing is arranged at a center of an upper surface of battery stack 2 in a posture extending in the stacking direction of battery cells 1. Gas duct 5 has a cylindrical shape with an inner capacity for smoothly discharging a material discharged from the opening part of exhaust valve 1a, opens at a lower surface, and is coupled to the opening part of exhaust valve 1a of each battery cell 1. Gas duct 5 in FIG. 5 has a rectangular cylindrical shape having a cross-sectional shape as a rectangular shape. Gas duct 5 is arranged in close contact with the upper surface of battery stack 2 so as not to form a gap with terminal surface 1X of battery cell 1 so as to discharge the exhaust gas discharged from exhaust valve 1a to the outside, and opening part 5a opening on the lower surface is coupled to exhaust valve 1a of each battery cell 1. Gas duct 5 may be arranged so as not to leak the exhaust gas by arranging a packing or sealing material or the like between the gas duct and terminal surface 1X.

Although not illustrated, the gas duct may be configured by a collective duct arranged on the upper surface of the battery stack in a posture extending in the stacking direction of the battery cells, and a branch duct coupled to the collective duct and having a tip end coupled to the exhaust valve. In this gas duct, the collective duct can be arranged away from the terminal surface, and the tip end of the branch duct can be coupled to the opening part of the exhaust valve.

(Cell Monitor Circuit 6)

Figure 6:
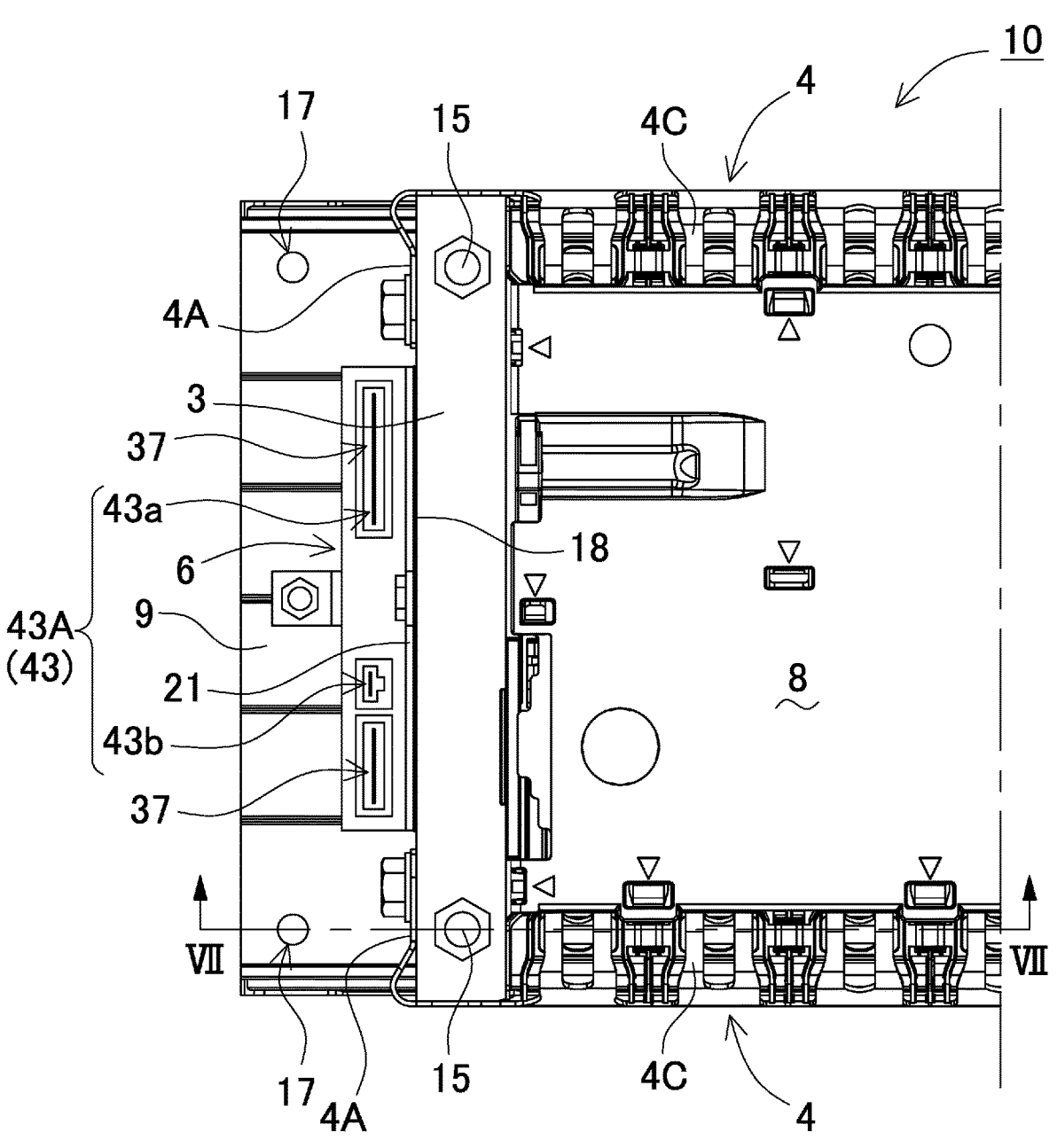
FIG. 6 is a plan view illustrating an end of the battery module illustrated in FIG. 3.
Figure 7:
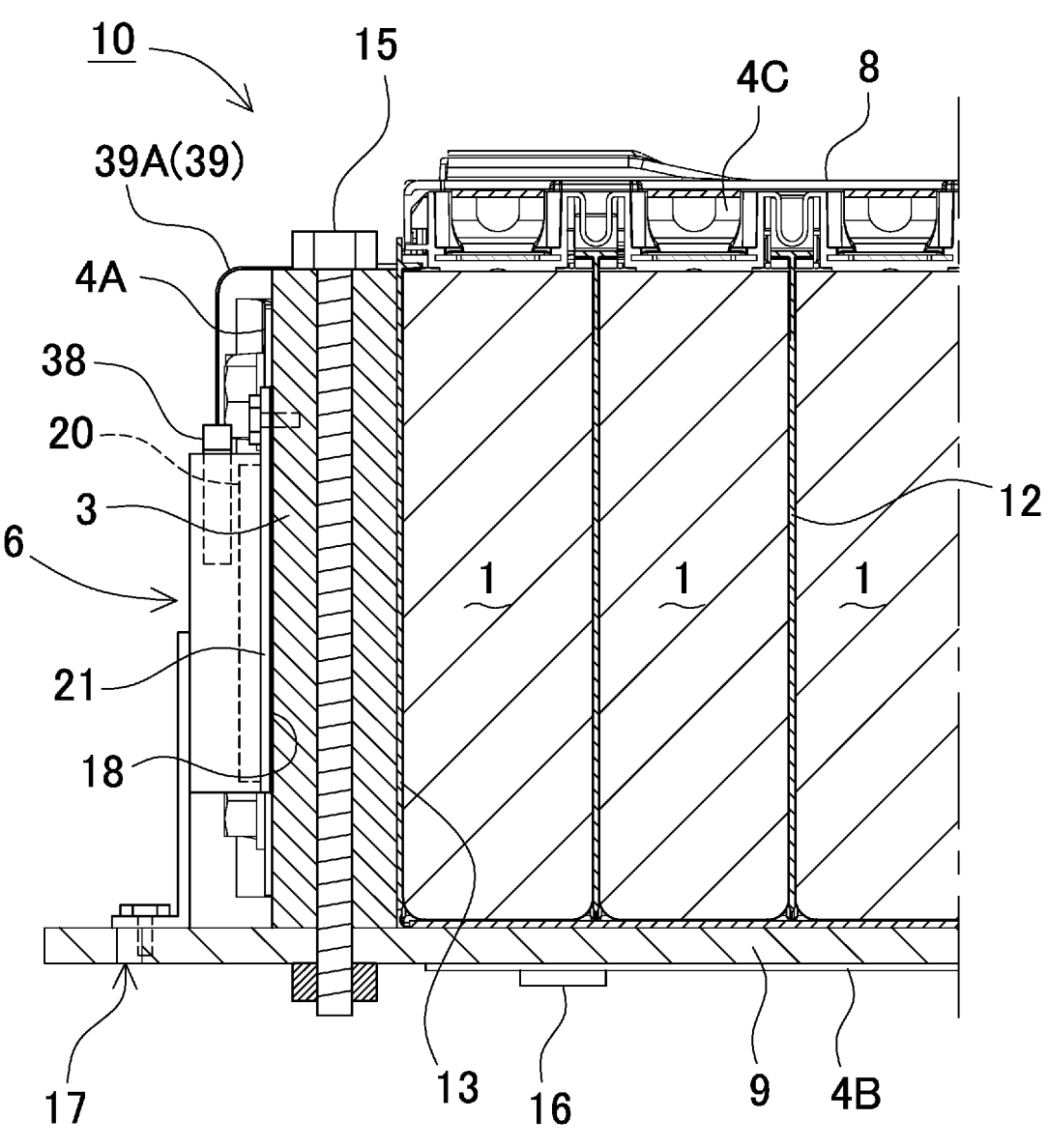
FIG. 7 is a cross-sectional view taken along line VII-VII of the battery module illustrated in FIG. 6.
Figure 8:
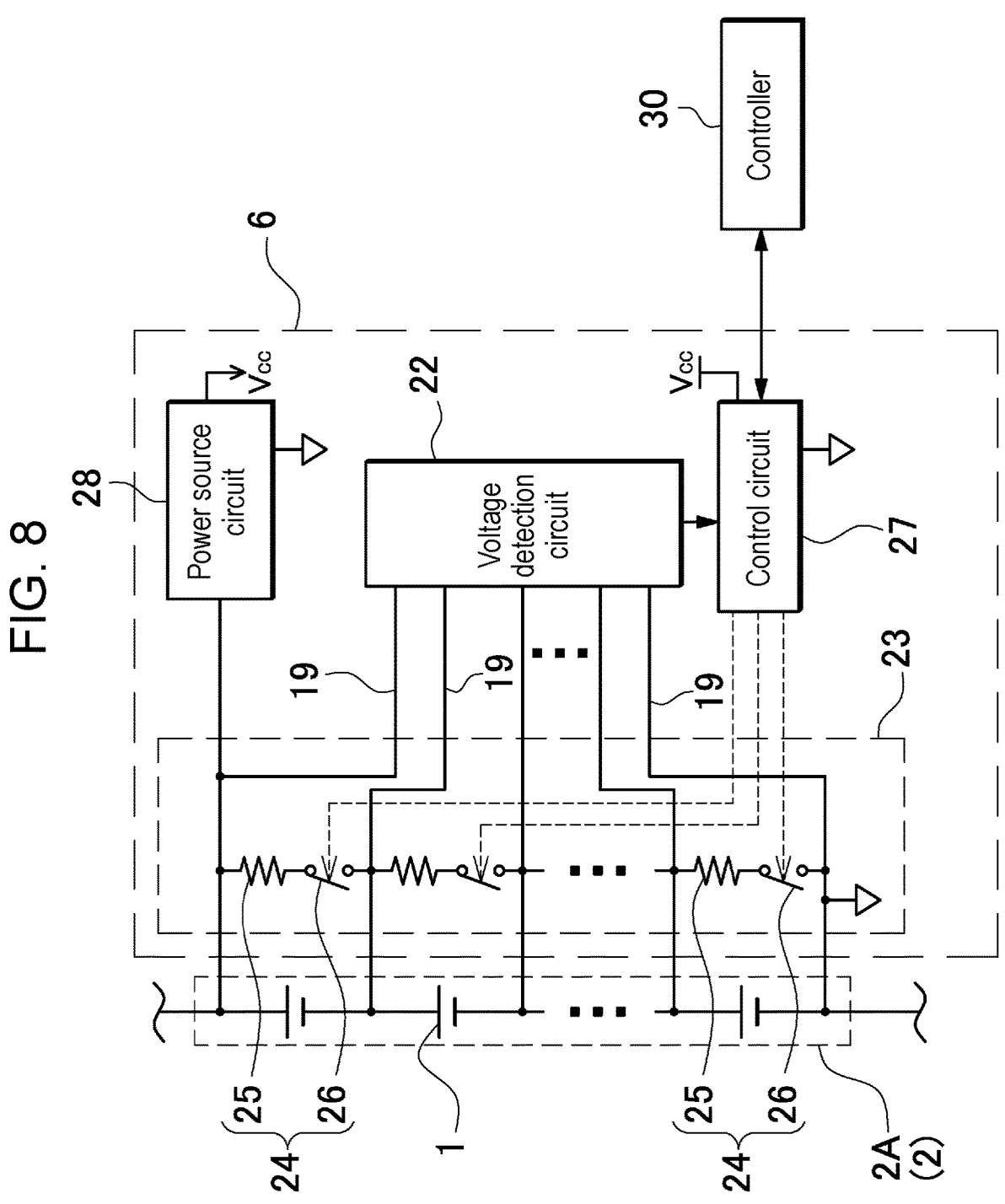
FIG. 8 is a circuit diagram illustrating an example of the cell monitor circuit.

Cell monitor circuit 6 is an electronic circuit block in which electronic components constituting the voltage detection circuit for detecting the cell voltage of battery cells 1 constituting battery stack 2 are mounted on a circuit board, or the whole cell monitor circuit is constituted by an integrated circuit. As illustrated in FIGS. 6 and 7, battery module 10 fixes cell monitor circuit 6 to an outer surface of end plate 3. In battery module 10 of FIGS. 2 to 4, cell monitor circuit 6 is fixed to one end plate 3, but cell monitor circuit 6 may be fixed to both end plates 3. As illustrated in FIG. 8, voltage detection circuit 22 of cell monitor circuit 6 is connected to each battery cell 1 via voltage detection line 19, and detects the voltage of battery cell 1.

Figure 9:
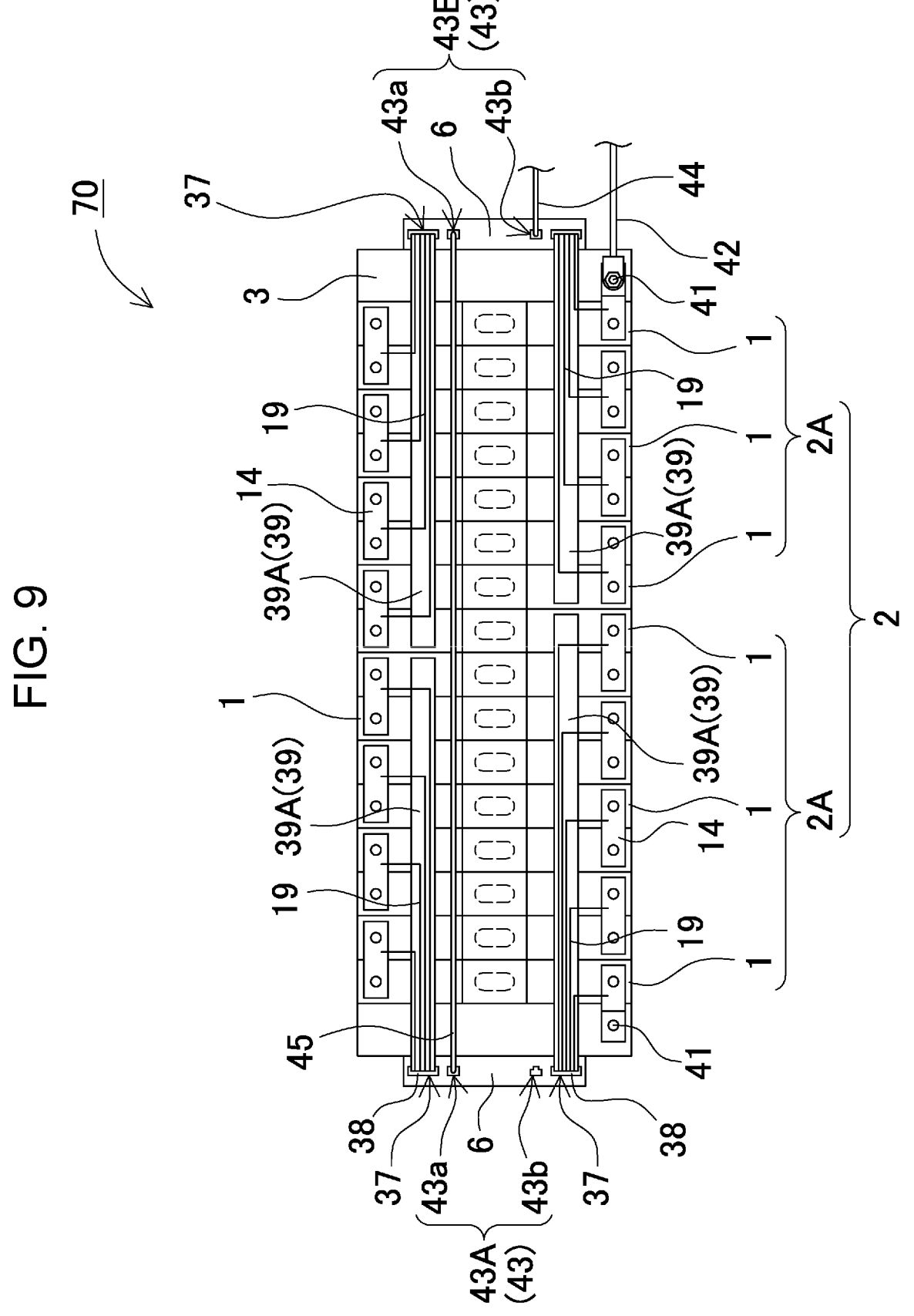
FIG. 9 is a schematic plan view illustrating another example of the battery module.

As illustrated in FIG. 9, battery module 70 that fixes cell monitor circuits 6 to both end plates 3 connects each cell monitor circuit 6 to battery cell 1 via voltage detection line 19. In battery module 70 in which cell monitor circuits 6 are fixed to both end plates 3, battery stack 2 is partitioned into two sets of battery units 2A in the middle in the stacking direction, and battery units 2A are connected to separate cell monitor circuits 6 via voltage detection line 19. In battery module 70 in which battery stack 2 is divided into two at the center, a length of longest voltage detection line 19 can be shortened to ½ of a length of the battery module including the set of cell monitor circuits.

In battery module 10 of FIGS. 2 to 5, voltage detection line 19 is wired on both sides of gas duct 5. The plurality of voltage detection lines 19 are wired as wire harnesses or printed boards 39 on the upper surface of battery stack 2. In particular, battery module 10 in which printed board 39 of voltage detection line 19 is flexible printed board 39A (FPC) has an advantage that a wiring space of voltage detection line 19 can be extremely thin.

Cell monitor circuit 6 illustrated in FIGS. 2 to 4 and 6 includes connection terminal 37 for connecting voltage detection line 19 which is flexible printed board 39A. Flexible printed board 39A in the drawing includes connector 38 for connecting to cell monitor circuit 6 at one end, and connector 38 is coupled to connection terminal 37 provided in cell monitor circuit 6. Thus, simple and reliable connection can be performed. Cell monitor circuit 6 illustrated in the drawing has a thin box shape such that the entire outer shape can be arranged along the outer surface of the end plate, and connection terminals 37 for coupling connector 38 are provided at both ends of the upper surface. In battery module 10 of FIG. 2, flexible printed board 39A of voltage detection line 19 is divided into two and the two divided printed boards are wired on both sides of gas duct 5, and connector 38 provided at a tip end of each flexible printed board 39A is connected to each connection terminal 37. This structure allows flexible printed board 39A connected to connection terminal 37 to be conveniently wired at a position not interfering with gas duct 5. However, the connection terminal may be arranged at the center of the upper surface of the box-shaped electronic circuit block. In this case, the voltage detection line (flexible printed board) connected to the connection terminal can be branched to the left and right and can be arranged on both sides of the gas duct.

In the battery module, the flexible printed board is not necessarily divided into two and wired on both sides of the gas duct, but one flexible printed board can be wired on one side of the gas duct, and the voltage detection line connected to the electrode terminal arranged on an opposite side can be wired in a posture straddling the gas duct. In this case, one connection terminal is provided in the cell monitor circuit, and all the voltage detection lines can be connected to the cell monitor circuit.

Printed board 39 illustrated in FIG. 2 has a structure in which inner wire 45 is integrated with voltage detection line 19. Inner wire 45 of printed board 39 illustrated in the drawing is a group of lines including a plurality of communication wires parallel to voltage detection line 19. In this structure, since inner wire 45 is integrated with voltage detection line 19, it is not necessary to wire a dedicated inner wire, and the wiring of inner wire 45 can be extremely simplified and assembled efficiently. In printed board 39, since both voltage detection line 19 and inner wire 45 are wired in a posture extending in the longitudinal direction of the battery assembly, both the voltage detection line and the inner wire can be efficiently wired as the group of lines including a plurality of communication wires. As described above, printed board 39 in which inner wire 45 is integrated with voltage detection line 19 is connected to cell monitor circuit 6 via connector 38. Cell monitor circuit 6 in the drawing has an integrated structure of connection terminal 37 and communication terminal 43 as terminals to which connector 38 is connected. However, inner wire 45 and voltage detection line 19 may be separate lines as illustrated in FIG. 9. In this case, in cell monitor circuit 6, a connection terminal to which voltage detection line 19 is connected and communication terminal 43 to which the inner wire is connected can be separately provided.

In cell monitor circuit 6, electronic components for implementing voltage detection circuit 22 are mounted on circuit board 20 (see FIGS. 6 and 7). However, cell monitor circuit 6 can have a structure in which all electronic circuits including voltage detection circuit 22 are used as an integrated circuit and the integrated circuit is embedded in a package of an insulation material. As illustrated in FIGS. 6 and 7, cell monitor circuit 6 can have a block shape in which a metal plate of radiator 21 provided on the surface is in close contact with the surface of end plate 3 and can be fixed in a thermally bonded state. Radiator 21 is thermally coupled to a heat generating component built in cell monitor circuit 6, for example, a discharge resistor of an equalizing circuit and a semiconductor element such as FET that controls a current, and dissipates heat energy of these heat generating components to the outside. Cell monitor circuit 6 has a plate shape as a whole by mounting the electronic components on circuit board 20, or has a plate shape by embedding the integrated circuit in the package.

Power supply device 100 including cell monitor circuit 6 including voltage detection circuit 22 detects the voltage of battery cell 1 of which the voltage fluctuates by charging and discharging, controls the charging and discharging of battery cell 1 by using battery information such as the detected cell voltage, controls the battery voltage within a set range, and prevents the overcharge and overdischarge of battery cell 1. In power supply device 100, controlling circuit 30 that controls the charging and discharging of battery cell 1 can be provided outside battery module 10 or in battery module 10. Controlling circuit 30 controls the charge and discharge current of battery cell 1 to prevent overcharge and overdischarge of battery cell 1. Power supply device 100 transmits the battery information from voltage detection circuit 22 provided in cell monitor circuit 6 to controlling circuit 30, and controls a charge and discharge current of battery cell 1 by controlling circuit 30.

Voltage detection circuit 22 preferably detects the voltages of all battery cells 1. However, it is possible for voltage detection circuit 22 not to necessarily detect the voltages of all battery cells 1 but to, for example, divide battery cells 1 constituting battery stack 2 into a plurality of battery units and detect a voltage of each battery unit. The battery unit in which the plurality of battery cells 1 are connected in parallel can detect the voltage of the battery unit and detect the voltages of all the battery cells. The battery unit in which the plurality of battery cells are connected in series detects the voltage of the battery unit and detects the total voltage of the battery cells connected in series. The battery unit in which the plurality of battery cells are connected in series includes 2 to 5 battery cells. Since this battery unit detects the voltage of the battery unit and detects the total voltage of the 2 to 5 battery cells 1, the voltages of the battery cells become ½ to ⅕ of the total voltage to be detected. The voltage of battery cell 1 changes depending on the remaining capacity. The voltage of battery cell 1 becomes higher than a preset maximum voltage when overcharged, and becomes lower than a minimum voltage when overdischarged. When battery cell 1 is overcharged or overdischarged, electrical characteristics are degraded and the safety also deteriorates. Voltage detection circuit 22 detects the voltage of battery cell 1 and transmits the voltage to controlling circuit 30, and controlling circuit 30 controls the charge and discharge current such that the voltage of battery cell 1 falls within a set range.

As battery module 10 repeats charging and discharging, the remaining capacity or the voltage of each battery cell 1 becomes imbalanced. Battery cells 1 connected in series are charged and discharged with the same current. Battery cells 1 are charged and discharged at the same current, but the electrical characteristics of battery cells 1 are not completely the same. Therefore, in battery module 10 in which the plurality of battery cells 1 are connected in series, the voltage or the remaining capacity of each battery cell 1 becomes imbalanced as the charging and discharging are repeated. The imbalance of battery cells 1 causes overcharge or overdischarge of specific battery cell 1. Since battery module 10 simultaneously charges and discharges all battery cells 1, the imbalance of battery cells 1 causes overcharge or overdischarge of specific battery cell 1. The overcharge and overdischarge of battery cell 1 deteriorate the electrical characteristics of battery cell 1, cause degradation, and degrade safety of battery module 10. Equalizing circuit 23 that eliminates the voltage imbalance of battery cells 1 is provided, and power supply device 100 can equalize the battery cells.

Power supply device 100 can implement equalizing circuit 23 in cell monitor circuit 6. Equalizing circuit 23 in FIG. 8 includes discharge circuit 24 in which switching elements 26 are connected in series to discharge resistors 25, and connects control circuit 27 that detects each cell voltage and controls switching elements 26 to be ON/OFF and voltage detection circuit 22 that detects the cell voltage of each battery cell 1. Equalizing circuit 23 provided in cell monitor circuit 6 equalizes the voltages of battery cells 1 by discharging battery cell 1 having a high voltage and charging battery cell 1 having a low voltage by using voltage detection lines 19. Thus, the voltages of the battery cells can be equalized to eliminate the imbalance. Equalizing circuit 23 can equalize the remaining capacity by discharging high-voltage battery cell 1 having a large remaining capacity.

Cell monitor circuit 6 fixed to end plate 3 can dissipate heat energy to end plate 3. Cell monitor circuit 6 includes a semiconductor element such as an FET that controls a current and a heat generating element such as a discharge resistor. Cell monitor circuit 6 can reduce temperature rise by dissipating the heat energy of the heat generating element to end plate 3. The temperature rise of cell monitor circuit 6 adversely affects a built-in heat generating element and the like. In particular, equalizing circuit 23 discharges battery cell 1 by the discharge resistor and lowers the voltage, but the discharge resistor generates heat by Joule heat of the discharge current. The discharge resistor can rapidly decrease the voltage of battery cell 1 in a short time by increasing the current, but Joule heat that causes the discharge resistor to generate heat increases in proportion to the square of the discharge current. Therefore, in equalizing circuit 23 capable of rapidly decreasing the voltage of battery cell 1 and shortening the equalization time, heat energy to generate heat increases. Equalizing circuit 23 equalizes battery cell 1 at a timing when battery cell 1 is not charged or discharged, and hence it is required to make the equalization time shorter. Since the equalization time can be shortened by increasing the current of the discharge resistor, how efficiently the heat generation energy of the discharge resistor can be dissipated becomes an important factor for specifying the equalization time.

Since the temperature rise due to the heat generation energy of the heat generating component results in a failure of the component, design is performed such that the entire heat generating component is enlarged so as not to abnormally rise in temperature, or the heat generation amount per unit time of discharge resistor is reduced. When cell monitor circuit 6 is downsized such that it can be arranged in a narrow space, a heat dissipation area is reduced, heat dissipation energy is reduced, and a temperature rise is increased. Thus, as in a related battery module, a cell monitor circuit that is downsized so as to be arranged in a small space between a gas duct and a bus bar has a small heat dissipation area, so that it is necessary to reduce heat dissipation energy. Therefore, in the cell monitor circuit arranged in a narrow space, it is necessary to reduce the heat dissipation energy, and the time for equalizing the battery cells becomes long. The battery module in which a large number of battery cells are stacked is used for a large-capacity application such as a battery module for driving a motor for a vehicle and a power source of a power storage device, and thus the capacity of the battery cell is also considerably large. In the large-capacity battery module, the capacity imbalance due to the battery cell voltage imbalance relatively increases as the battery cell capacity increases. Therefore, in this type of battery module, since the equalization time of the battery cells is shortened as much as possible and the battery cells are quickly equalized, it is possible to increase the discharge current, but the increase in the discharge resistor increases the heat generation energy, and it is thus required to increase the heat dissipation area. Therefore, in order to dispose the cell monitor circuit in a narrow space, downsizing is required, and in order to shorten the equalization time by discharging with a large current, it is necessary to increase the heat dissipation area and increase the size. Thus, in the cell monitor circuit, downsizing and shortening of the equalization time are characteristics that contradict each other, and both the characteristics cannot be satisfied. There is a need for solving a contradicting problem of downsizing that is required for arranging the cell monitor circuit in a limited space and upsizing for having a high discharge capability.

In battery module 10 in which cell monitor circuit 6 is fixed to end plate 3 in a thermally coupled state and end plate 3 is used in combination with heat dissipation of cell monitor circuit 6, the heat generation energy of cell monitor circuit 6 can be efficiently dissipated by end plate 3. In particular, end plate 3 has a very large heat capacity, and has a small temperature rise with respect to the heat energy to be absorbed, so that the equalization time of battery cells 1 can be shortened. Furthermore, end plate 3 has a large surface area and large heat dissipation energy from the surface, and this also reduces the temperature rise. Furthermore, in the structure for fixing end plate 3 to base plate 9, heat energy is conducted from end plate 3 to base plate 9, and the temperature rise is further reduced. In the structure in which base plate 9 is forcibly cooled or cooling plates are stacked on base plate 9, end plate 3 is forcibly cooled by base plate 9, the temperature rise is further reduced, the cooling effect of cell monitor circuit 6 is further increased, and the temperature rise of cell monitor circuit 6 is reduced to an ideal state.

In battery module 10 of FIGS. 6 and 7, cell monitor circuit 6 is arranged on the outer surface of end plate 3. Battery module 10 has an advantage that heat generation energy of cell monitor circuit 6 can be conducted to fixed end plate 3 and dissipate heat, and heat can also be dissipated from the exposed surface to the outside air to dissipate heat more efficiently. The outer shape of cell monitor circuit 6 fixed to the surface of end plate 3 is smaller than the outer shape of end plate 3, and does not protrude from the outer peripheral edge of end plate 3. In battery module 10, cell monitor circuit 6 does not increase the outer shape of battery module 10 while cell monitor circuit 6 is arranged on end plate 3, and cell monitor circuit 6 can efficiently dissipate heat while being downsized.

In battery module 10 of FIG. 7, a thickness of cell monitor circuit 6 is set to a dimension that does not protrude from the tip end edge of base plate 9 to the outer surface in plan view. In battery module 10, the outer shape in plan view does not become larger than that of base plate 9 while cell monitor circuit 6 is fixed to end plate 3, and cell monitor circuit 6 can be arranged at an ideal position while being downsized as a whole.

End plate 3 is pressed from the inside with a strong pressure by battery cell 1 exhibiting a physical property of expanding when charged and discharged. End plate 3 pressed against battery stack 2 and having both side edges fixed by bind bar 4 is curved by the pressure of battery stack 2. When cell monitor circuit 6 deforms by curved end plate 3, the configuration components of cell monitor circuit 6 are adversely affected. For example, cell monitor circuit 6 in which the electronic component is fixed to the circuit board has an adverse effect such as the circuit board being curved and the conducting part being damaged. In cell monitor circuit 6 of FIG. 7, a part of an upper edge part, preferably the center, is locally fixed to end plate 3, and a lower part is fixed to the tip end of base plate 9. In battery module 10, even though battery cell 1 expands and end plate 3 deforms, the deformation does not adversely affect cell monitor circuit 6. In battery module 10 described above, since a part of the upper edge part of cell monitor circuit 6 is locally fixed to end plate 3, even when end plate 3 is curved, the cell monitor circuit does not deform together. Since the lower part of cell monitor circuit 6 is fixed to the tip end of base plate 9, the cell monitor circuit is reliably fixed with the upper part and the lower part. That is, cell monitor circuit 6 is firmly fixed to end plate 3 and base plate 9 without being adversely affected by deformation of end plate 3.

Battery module 10 in which cell monitor circuit 6 is fixed to base plate 9 has a feature that cell monitor circuit 6 is arranged at a position different from fixing holes 17 in plan view, whereby base plate 9 can be easily and reliably fixed to usage equipment such as a chassis of a vehicle while fixing cell monitor circuit 6 to end plate 3. In battery module 10 of FIG. 6, fixing holes 17 are provided on both sides of the base plate 9, and an interval between fixing holes 17 is set to a horizontal width in which cell monitor circuit 6 can be arranged.

Cell monitor circuit 6 is preferably fixed to end plate 3 in an insulated manner. Cell monitor circuit 6 is fixed by arranging insulating sheet 18 between the cell monitor circuit and end plate 3. As an elastic sheet made of a rubber-like elastic body, insulating sheet 18 can constantly hold curved end plate 3 and cell monitor circuit 6 in a thermally coupled state. While cell monitor circuit 6 fixed to end plate 3 in an insulated manner has a structure in which radiator 21 made of metal and the like are exposed to the surface and can efficiently dissipate heat, the cell monitor circuit can improve insulation characteristics with respect to battery stack 2 arranged inside end plate 3, and thus, reliability can be raised. Battery module 10 in which end plates 3 are arranged on both end surfaces of battery stack 2 can prevent electric shock and electric leakage by insulating end plates 3 from a ground line. High-voltage battery stack 2 is arranged inside end plate 3 insulated from the ground line. End plate 3 insulated from battery stack 2 maintains high electric leakage resistance with battery stack 2, but the electric leakage resistance may decrease due to various factors. For example, dew condensation water between end plate 3 and battery stack 2 causes a decrease in electric leakage resistance. Cell monitor circuit 6 arranged in an insulated manner from end plate 3 is insulated from end plate 3 even when contact resistance between end plate 3 and battery stack 2 is lowered, and adverse effects such as electric leakage and electric shock are prevented to ensure high safety and reliability. However, since the end plate is insulated from the battery stack, the end plate can be connected to the ground line.

In battery module 10 described above, since the heat generating component of equalizing circuit 23 of cell monitor circuit 6 can be efficiently dissipated by end plate 3, the battery module has an advantage that equalizing circuit 23 can quickly equalize battery cells 1. This is because the power consumption of equalizing circuit 23 is increased to discharge battery cell 1 with a large current, and the voltage of high-voltage battery cell 1 can be rapidly reduced. Equalizing circuit 23 discharges high-voltage battery cell 1 to eliminate voltage imbalance or charges low-voltage battery cell 1 with high-voltage battery cell 1 and thus equalizes. The circuit that discharges and equalizes high-voltage battery cell 1 discharges high-voltage battery cell 1 with discharge resistor 25, and the circuit that charges low-voltage battery cell 1 with high-voltage battery cell 1 supplies electric power from high-voltage battery cell 1 to low-voltage battery cell 1 and equalizes. In the circuit that discharges and equalizes battery cell 1 by discharge resistor 25, discharge resistor 25 that discharges battery cell 1 and the semiconductor element that is switching element 26 that controls the discharge current of discharge resistor 25 generate heat. This circuit has a structure for efficiently discharging the heat energy of discharge resistor 25 and the semiconductor element, and can shorten the time for equalizing by increasing the discharge current of discharge resistor 25 and the semiconductor element. When the discharge current is increased, a heat generation amount is also increased. Therefore, efficient discharge can increase the discharge current. In the equalizing circuit that charges the low-voltage battery cell with the high-voltage battery cell, the semiconductor element that controls the current to be charged from the high-voltage battery cell to the low-voltage battery cell generates heat, and therefore the time for equalization can be shorten by increasing the current of this semiconductor element.

In power supply device 100 in which the plurality of battery modules 10 are connected in series, since a potential difference is generated in a ground line of each battery module 10, the battery modules cannot be cascade-connected. Since communication terminal 43 of each cell monitor circuit 6 transmits a signal with the ground line as a reference potential, the plurality of communication terminals 43 having a potential difference with the ground line cannot be connected in series. This adverse effect can be eliminated by applying a bias voltage to the ground line of cell monitor circuit 6 having a potential difference to shift a direct current level of the ground line and setting the potential difference of the ground line of communication terminal 43 to be connected to a 0 level. However, in this circuit configuration, a circuit for applying a bias voltage becomes complicated, and it is also necessary to prevent a temperature shift of the bias voltage. Thus, the circuit configuration becomes more complicated.

Figure 10:
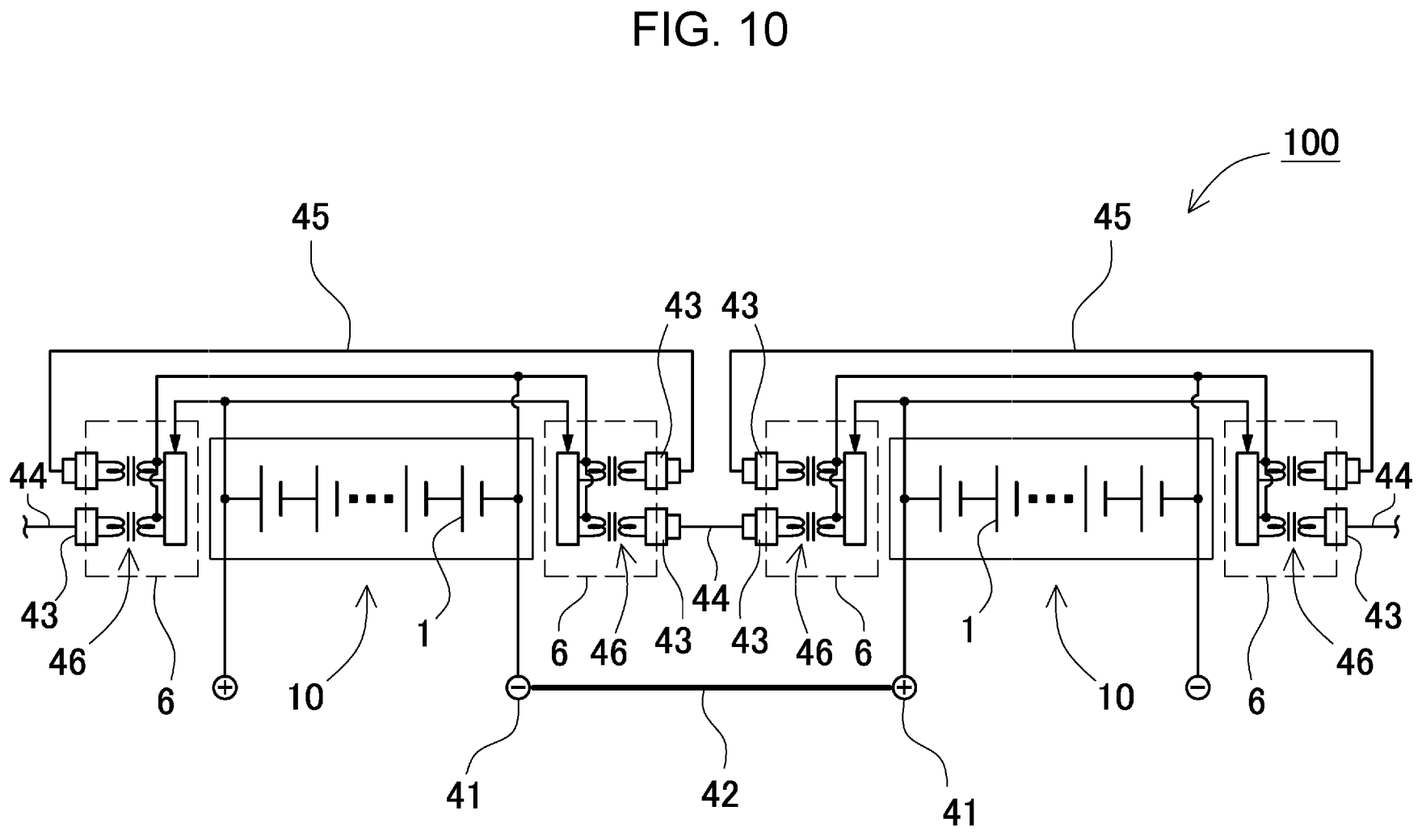

In order to prevent the above adverse effect and cascade-connect communication terminals 43 of all cell monitor circuits 6, cell monitor circuit 6 includes communication terminal 43 that cascade-connects the plurality of cell monitor circuits 6 and transmits a signal. As illustrated in FIG. 10, communication terminal 43 is internally connected via coupling element 46 that interrupts the direct current and allows an alternating current signal to pass. Any of a coupling capacitor, a signal transmission transformer, and an optical transmission element can be used as coupling element 46. Since cell monitor circuit 6 cuts off a direct current component by coupling element 46 and transmits only the alternating signal to communication terminal 43, there is an advantage that communication terminals 43 of the plurality of cell monitor circuits 6 can be cascade-connected to transmit the signal without adjusting the direct current level of the ground line of communication terminal 43. This is particularly effective in a device in which the plurality of battery modules 10 are connected in series.

The power supply device described above can be used as a power source for a vehicle where electric power is supplied to a motor used for causing an electric vehicle to travel. As an electric vehicle on which the power supply device is mounted, an electric vehicle such as a hybrid car or a plug-in hybrid car that travels by both an engine and a motor, or an electric car such as an electric car that travels only by a motor can be used, and the power supply device is used as a power source for these vehicles. In order to provide electric power that drives the vehicle, it is preferable that a large-capacity, high-output power supply device is mounted and includes a plurality of the above-described battery modules that are connected in series or parallel and a controlling circuit that is a necessary addition.

(Power Supply Device for Hybrid Car)

Figure 11:
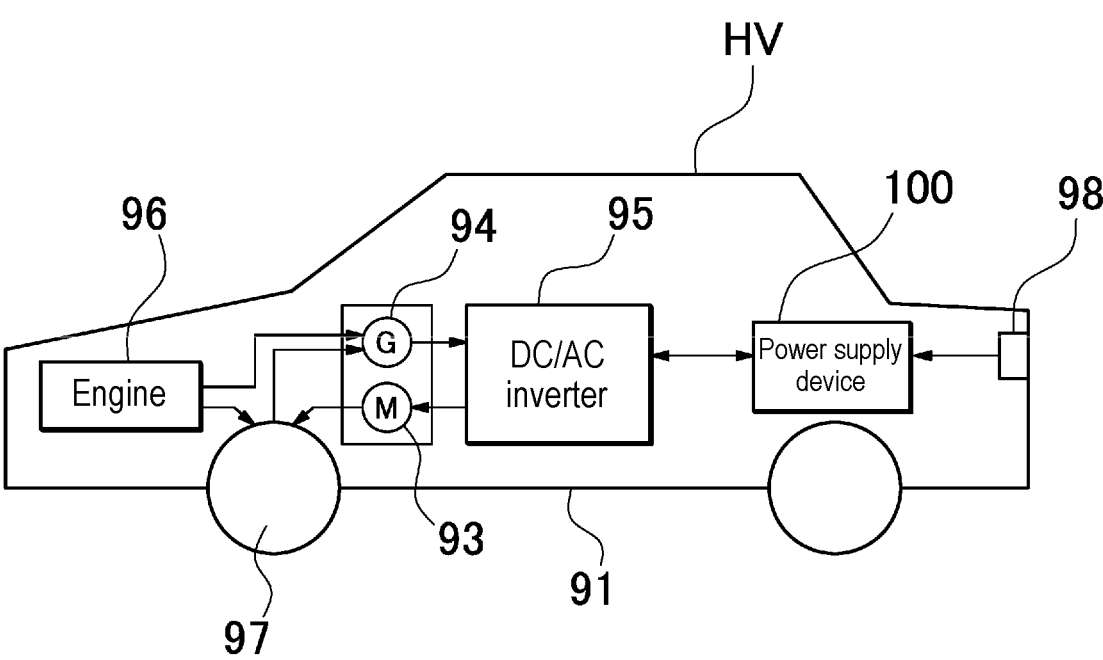
FIG. 11 is a block diagram illustrating an example in which the battery module is mounted on a hybrid car that travels by an engine and a motor.

FIG. 11 illustrates an example in which the power supply device is mounted on the hybrid car that travels by both the engine and the motor. Vehicle HV illustrated in the drawing on which the power supply device is mounted includes: vehicle body 91; engine 96 and motor 93 for traveling that causes vehicle body 91 to travel; wheels 97 that are driven by engine 96 and motor 93 for traveling; power supply device 100 that supplies electric power to motor 93; and power generator 94 that charges a battery of power supply device 100. Power supply device 100 is connected to motor 93 and power generator 94 via DC/AC inverter 95. Vehicle HV travels using both motor 93 and engine 96 while charging and discharging the battery of power supply device 100. Motor 93 is driven in a region where an engine efficiency is low, for example, during acceleration or low-speed traveling, and causes the vehicle to travel. Motor 93 is driven by electric power supplied from power supply device 100. Power generator 94 is driven by engine 96 or driven by regenerative braking acquired when braking is applied to a vehicle, and charges the battery of power supply device 100. As illustrated in the drawing, vehicle HV may include charging plug 98 to charge power supply device 100. Connecting charging plug 98 to an external power source enables charging of power supply device 100.

(Power Supply Device for Electric Car)

Figure 12:
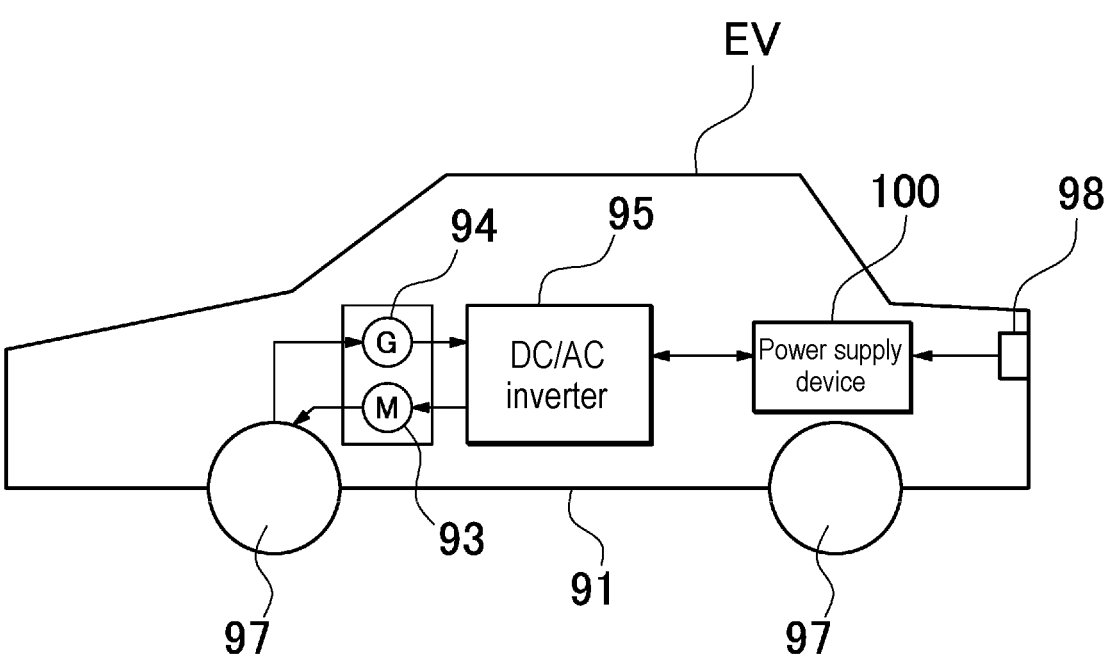
FIG. 12 is a block diagram illustrating an example in which the battery module is mounted on an electric car traveling only by a motor.

Further, FIG. 12 illustrates an example in which a power supply device is mounted on an electric car that travels only with a motor. Vehicle EV illustrated in the drawing on which the power supply device is mounted includes vehicle body 91, motor 93 for traveling that causes vehicle body 91 to travel, wheels 97 driven by motor 93, power supply device 100 that supplies electric power to motor 93, and power generator 94 that charges the battery of power supply device 100. Power supply device 100 is connected to motor 93 and power generator 94 via DC/AC inverter 95. Motor 93 is driven by electric power supplied from power supply device 100. Power generator 94 is driven by the energy at the time of applying regenerative braking to vehicle EV and charges the battery of power supply device 100. Vehicle EV includes charging plug 98, and power supply device 100 can be charged by connecting charging plug 98 to an external power source.

(Power Supply Device for Power Storage Device)

Figure 13:
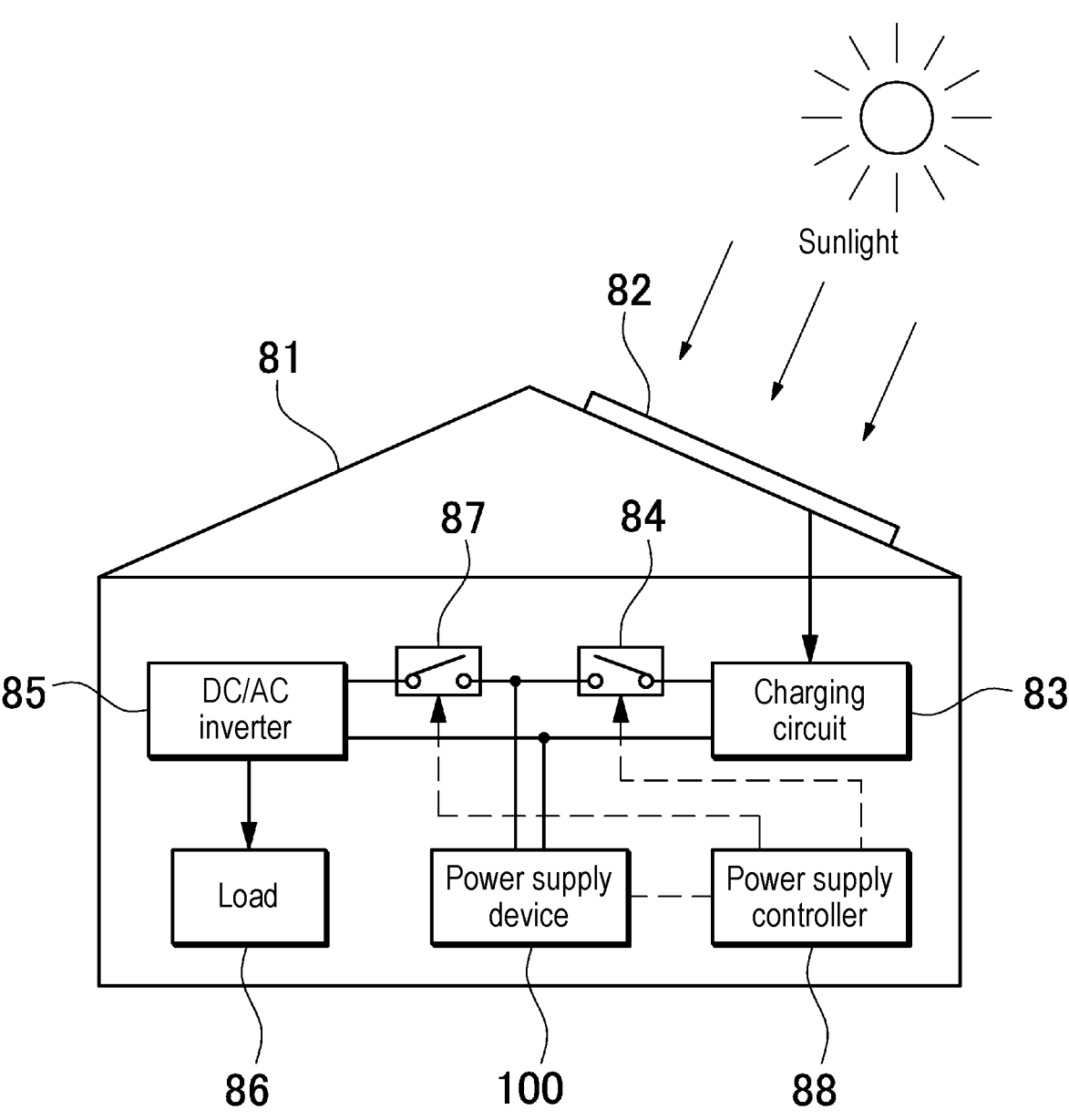
FIG. 13 is a block diagram illustrating an example in which the battery module is used in a power storage device.
Figure 14:
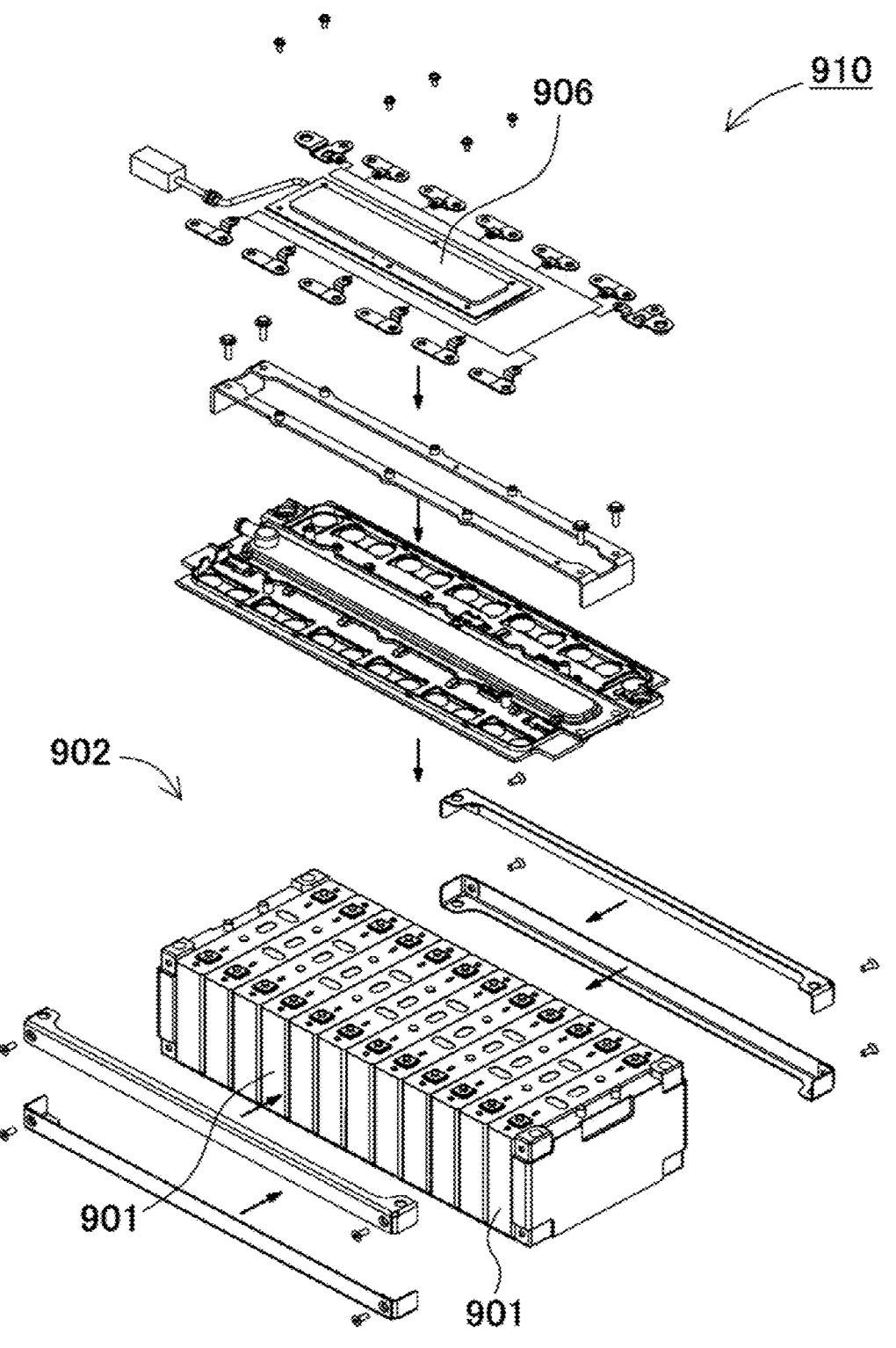
FIG. 14 is an exploded perspective view of a related battery module.
Figure 15:
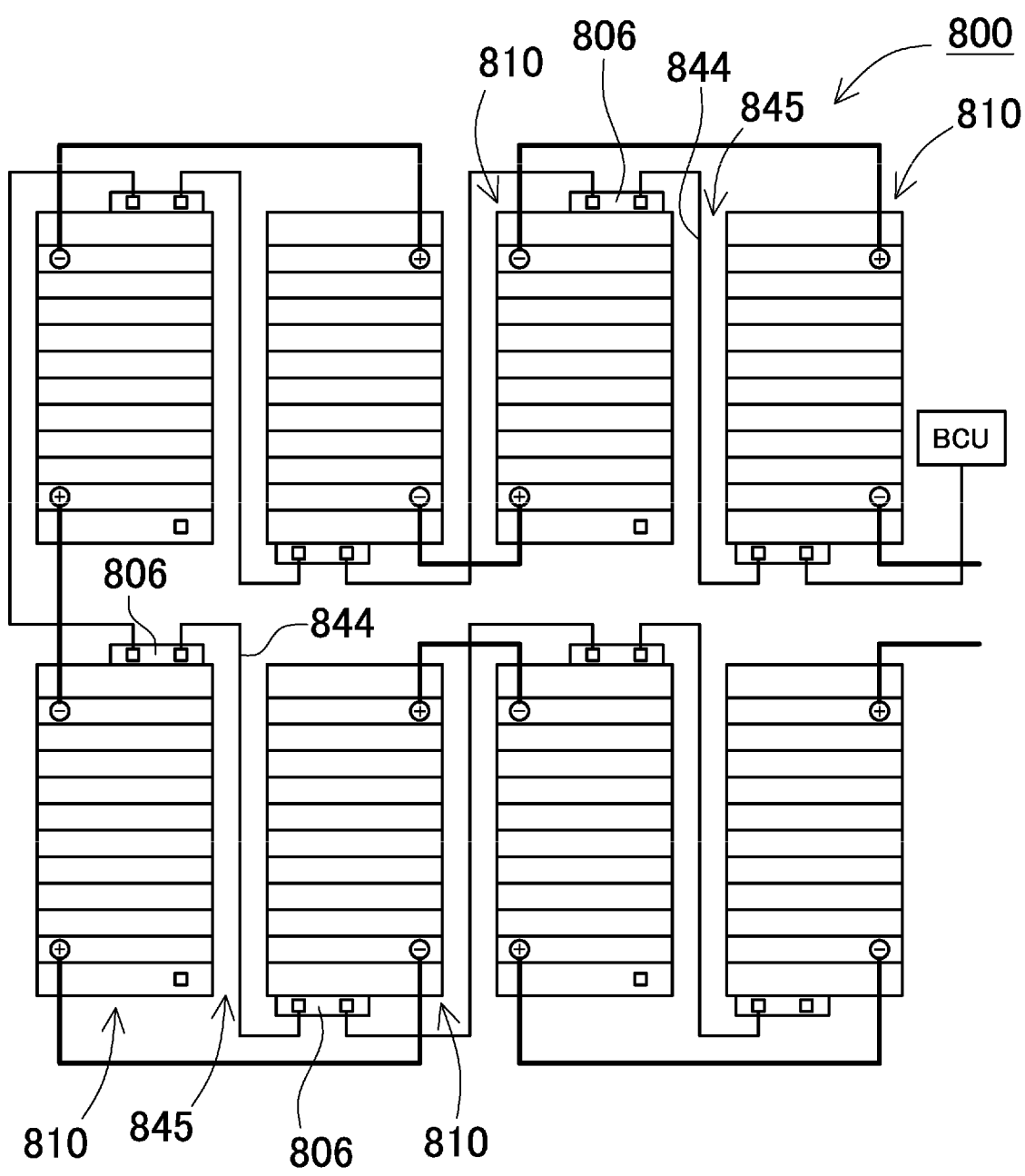
FIG. 15 is a schematic configuration diagram of a related power supply device.

The application of the power supply device of the present invention is not limited to a power source for a motor that causes a vehicle to travel. The power supply device according to the exemplary embodiment can also be used as a power source for a power storage device that stores electricity by charging a battery with electric power generated by photovoltaic power generation, wind power generation, or the like. FIG. 13 illustrates a power storage device that charges and stores the batteries of power supply device 100 with solar battery 82.

The power storage device illustrated in FIG. 13 charges the batteries of power supply device 100 with electric power generated by solar battery 82 arranged on a roof, a rooftop, or the like of building 81 such as a house or a factory. The power storage device charges the batteries of power supply device 100 via charging circuit 83 with solar battery 82 serving as a charging power source, and then supplies electric power to load 86 via DC/AC inverter 85. Thus, this power storage device includes a charge mode and a discharge mode. In the power storage device illustrated in the drawing, DC/AC inverter 85 is connected to power supply device 100 via discharging switch 87 and charging circuit 83 is connected to the power supply device via charging switch 84. Discharging switch 87 and charging switch 84 are turned on and off by power supply controller 88 of the power storage device. In the charge mode, power supply controller 88 turns on charging switch 84 and turns off discharging switch 87 to allow charging from charging circuit 83 to power supply device 100. When charging is completed and the battery is fully charged or when the battery is in a state where a capacity of a predetermined value or more is charged, power supply controller 88 turns off charging switch 84 and turns on discharging switch 87 to switch the mode to the discharge mode and allows discharging from power supply device 100 to load 86. When necessary, the power supply controller can supply electric power to load 86 and charge power supply device 100 simultaneously by turning on charging switch 84 and turning on discharging switch 87.

Although not illustrated, the power supply device can also be used as a power source of a power storage device that performs power storage by charging a battery using midnight electric power at night. The power supply device that is charged with midnight electric power is charged with the midnight electric power that is surplus electric power generated by a power station, and outputs the electric power during the daytime when an electric power load increases, which can limit peak electric power during the daytime to a small value. The power supply device can also be used as a power source charged with both output of a solar battery and the midnight electric power. This power supply device can efficiently perform power storage using both electric power generated by the solar battery and the midnight electric power effectively in consideration of weather and electric power consumption.

The power storage device described above can be suitably used for the following applications: a backup power supply device mountable in a rack of a computer server; a backup power supply device used for radio base stations of cellular phones; a power source for power storage used at home or in a factory; a power storage device combined with a solar battery, such as a power supply for street lights; and a backup power supply for traffic lights or traffic displays for roads.

INDUSTRIAL APPLICABILITY

A power supply device according to the present invention can be suitably used as a power source for a plug-in hybrid electric car and a hybrid electric car that can switch between an electric vehicle (EV) traveling mode and a hybrid electric vehicle (HEV) traveling mode, an electric car, and the like. The power supply device can be suitably used for the following applications: a backup power source mountable in a rack of a computer server; a backup power supply device used for radio base stations of cellular phones; a power source for power storage used at home or in a factory; a power storage device combined with a solar battery, such as a power supply for street lights; and a backup power supply for traffic lights or traffic displays for roads.

REFERENCE MARKS IN THE DRAWINGS

100: power supply device
1: battery cell
1a: exhaust valve
1X: terminal surface
2: battery stack
2A: battery unit
3: end plate
4: bind bar
4A: fixing part
4B: lower coupling piece
4C: pressing piece
5: gas duct
5a: opening part
6: cell monitor circuit
7: battery assembly
8: cover case
9: base plate
10: battery module
11: electrode terminal
12: insulating spacer
13: end surface spacer
14: bus bar
15: fixing screw
16: fixing screw
17: fixing hole
18: insulating sheet
19: voltage detection line
20: circuit board

21: radiator
22: voltage detection circuit
23: equalizing circuit
24: discharge circuit
25: discharge resistor
26: switching element
27: control circuit
28: power source circuit
30: controlling circuit
35: battery controller
37: connection terminal
38: connector
39: printed board
39A: flexible printed board
41: output terminal
42: power line
43: communication terminal
43A: communication terminal
43a: internal communication terminal
43b: external communication terminal
43B: communication terminal
44: communication line
45: inner wire
46: coupling element
47: relay connector
70: battery module
81: building
82: solar battery
83: charging circuit
84: charging switch
85: DC/AC inverter
86: load
87: discharging switch
88: power supply controller
91: vehicle body
93: motor
94: power generator
95: DC/AC inverter
96: engine
97: wheel
98: charging plug
800: power supply device
806: cell monitor circuit
810: battery module
844: communication line
845: wiring space
901: battery cell
902: battery stack
906: cell monitor circuit
910: battery module
HV, EV: vehicle

The invention claimed is:

1. A power supply device comprising a plurality of battery modules including:

battery stacks including a plurality of battery cells stacked; and cell monitor circuits that detect battery information of the plurality of battery cells, communication lines connecting the cell monitor circuits of the plurality of battery modules being cascade-connected to each other, and a voltage detection line that connects the plurality of battery cells constituting the battery stack and the cell monitor circuits, wherein each of the plurality of battery modules includes:

a pair of communication terminals, the communication terminals being arranged at both ends of each of the plurality of the battery modules, and one of the pair of communication terminals being connected to the cell monitor circuit, an inner wire that connects the pair of communication terminals positioned at both the ends to each other; and a cover case that covers the inner wire, the communication lines are connected to the communication terminals, the inner wire is wired inside the cover case, the inner wire is a group of lines including a plurality of communication wires parallel to the voltage detection line, and the groups of lines is a flexible printed board wiring the voltage detection line and the inner wire.

2. The power supply device according to claim 1, wherein the plurality of battery modules are connected in series via power lines, and the plurality of battery modules connected in series via the power lines are cascade-connected via the communication lines.

3. The power supply device according to claim 2, wherein the plurality of battery modules comprises a pair of battery modules among the plurality of battery modules arranged in a straight line, output terminals at ends opposing each other of the pair of battery modules are connected by one of the power lines, and the pair of communication terminals at ends opposing each other of the pair of battery modules are connected via one of the communication lines.

4. The power supply device according to claim 2, wherein the plurality of battery modules comprises a pair of battery modules arranged adjacent to each other in parallel, output terminals of ends approaching each other are connected by one of the power lines, and the pair of the communication terminals of ends approaching each other are connected via one of the communication lines.

5. The power supply device according to claim 1, wherein each of the plurality of battery modules includes a battery assembly arranging each of the battery stacks between a pair of end plates, and the cell monitor circuits are arranged on the end plates.

6. The power supply device according to claim 5, wherein the pair of communication terminals are arranged on the end plates.

7. The power supply device according to claim 6, wherein one of the cell monitor circuits is arranged on one of the end plates of each of the battery module, and the pair of communication terminals is arranged on the one of the cell monitor circuits arranged on one of end plates and one of the end plates where the one of the cell monitor circuits is not arranged.

8. The power supply device according to claim 7, wherein the pair of communication terminals provided on the end plates are relay connectors, and each of the relay connectors connects the inner wire and each of the communication lines.

9. The power supply device according to claim 1, wherein the pair of communication terminals comprises a connector that detachably connects the communication line.

10. An electric vehicle comprising:

the power supply device according to claim 1;

a motor for travelling that receives electric power from the power supply device;

a vehicle body on which the power supply device and the motor are mounted; and wheels that are driven by the motor and cause the vehicle body to travel.

11. A power storage device comprising:

the power supply device according to claim 1; and a power supply controller that controls charging and discharging of the power supply device, wherein the power supply controller enables charging of the battery cells with electric power from outside, and controls charging to be performed on the battery cells.

12. The power supply device according to claim 1, wherein the plurality of battery modules comprises a first battery module and a second battery module arranged adjacent to the first battery module, one of the pair of communication terminals of the first battery module is connected to the other of the pair of communication terminals of the second battery module via the communication line directly.

13. The power supply device according to claim 1, wherein the inner wire comprises a pair of inner wires, and the pair of inner wires are provided horizontally between an upper surface of stacked battery cells and the cover case.

14. The power supply device according to claim 1, wherein the cell monitor circuit defines a connection terminal opening at an upper end thereof to receive a connector of the inner wire.

* * * * *